(12) United States Patent
Srinivasan et al.

(10) Patent No.: US 11,526,877 B2
(45) Date of Patent: Dec. 13, 2022

(54) ELECTRONIC DEVICES HAVING EMBEDDED CIRCUITRY FOR ACCESSING REMOTE DIGITAL SERVICES

(71) Applicant: Coinbase, Inc., Oakland, CA (US)

(72) Inventors: Balaji S. Srinivasan, San Francisco, CA (US); Daniel Firu, San Francisco, CA (US); Veerbhan Kheterpal, San Francisco, CA (US); Nigel Drego, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 273 days.

(21) Appl. No.: 17/017,449

(22) Filed: Sep. 10, 2020

(65) Prior Publication Data

US 2020/0410488 A1   Dec. 31, 2020

Related U.S. Application Data

(63) Continuation of application No. 14/920,524, filed on Oct. 22, 2015, now abandoned.

(51) Int. Cl.
| | |
|---|---|
| *G06Q 20/00* | (2012.01) |
| *G06Q 20/38* | (2012.01) |
| *G06Q 20/36* | (2012.01) |
| *H04N 5/232* | (2006.01) |
| *G06Q 30/02* | (2012.01) |
| *H04L 67/10* | (2022.01) |

(52) U.S. Cl.
CPC ..... *G06Q 20/38215* (2013.01); *G06Q 20/363* (2013.01); *G06Q 20/3672* (2013.01); *G06Q 20/3829* (2013.01); *G06Q 30/0226* (2013.01); *H04L 67/10* (2013.01); *H04N 5/23206* (2013.01); *G06Q 2220/00* (2013.01)

(58) Field of Classification Search
USPC .......................... 705/16, 21, 59; 380/44, 262
See application file for complete search history.

(56) References Cited

U.S. PATENT DOCUMENTS

| | | | |
|---|---|---|---|
| 8,727,893 B2 | 5/2014 | Lee et al. | |
| 9,135,787 B1 | 9/2015 | Russell et al. | |
| 2009/0119407 A1* | 5/2009 | Krishnan | H04L 63/126 709/228 |
| 2013/0282580 A1 | 10/2013 | O'Brien et al. | |
| 2013/0346309 A1 | 12/2013 | Giori | |
| 2014/0164251 A1 | 6/2014 | Loh | |
| 2014/0258110 A1 | 9/2014 | Davis et al. | |
| 2014/0258121 A1 | 9/2014 | Raman | |
| 2014/0279542 A1 | 9/2014 | Baird et al. | |
| 2014/0316984 A1 | 10/2014 | Schwartz | |

(Continued)

FOREIGN PATENT DOCUMENTS

| | | |
|---|---|---|
| CA | 2809352 | 9/2014 |
| WO | 2014040717 A1 | 3/2014 |

OTHER PUBLICATIONS

"Block", Bitcoin Wiki, Mar. 2, 2014 [Retrieved on Apr. 14, 2014]. Retrieved from the Internet <URL:https://en.bitcoin.it/wiki/Block>.

(Continued)

*Primary Examiner* — Dante Ravetti
(74) *Attorney, Agent, or Firm* — Perkins Coie LLP

(57) ABSTRACT

Systems and methods for accessing remote digital services by using embedded circuitry included in an electronic device.

20 Claims, 15 Drawing Sheets

(56) References Cited

U.S. PATENT DOCUMENTS

| | | |
|---|---|---|
| 2015/0033301 A1 | 1/2015 | Pianese et al. |
| 2015/0294308 A1 | 10/2015 | Pauker et al. |
| 2016/0112200 A1 | 4/2016 | Kheterpal et al. |
| 2019/0303888 A1 | 10/2019 | Hamasni et al. |

OTHER PUBLICATIONS

"Mining", Bitcoin Wiki, Apr. 1, 2014 [Retrieved on Apr. 14, 2014]. Retrieved from the Internet <URL:https://en.bitcoin.it/wiki/Mining>.

"Mining Pool Reward FAQ", Bitcoin Wiki. Jun. 27. 2011. XP055197824, Retrieved from the Internet: <URL:http://en.bitcoin.it/wiki/Mining_poolreward_FAQ> [retrieved on Jun. 23, 2015].

Barber, Simon, et al., Bitter to Better How to Make Bitcoin a Better Currency, Mar. 2, 2012, Financial Cryptography and 6 Data Security, Sprincer Berlin Heildelberg, berlin, Heidelberg, pp. 399-414, XP04701 3846 • ISBN: 978-3-642-32945-6.

Berke, Alexandra, Bitcoin Demystified: A Hacker's Perspective, Huff Post Code, Nov. 25, 2013 [Retrieved on 2 Apr. 14, 2014]. Retrieved from the Internet.

Hurlburt, George F., et al., Bitcoin: Benefit or Curse? IT Pro May/Jun. 2014, IEEE Computer Society, pp. 10-15.

Luu, Loi, et al., "On Power Splitting Games in Distributed Computation: The Case of Bitcoin Pooled Mining", International Association for Cryptologic Research, vol. 20150227:213542, Feb. 24, 2015, pp. 1-18, XP061018051, [retrieved on Feb. 24, 2015].

Nakamoto, Satoshi, "Bitcoin: A Peer-to-Peer Electronic Cash System", Oct. 31, 2008, XP055131503, Retrieved from the Internet: <URL:http:llbitcon.org/bitcon.pdf> [retreived on Jul. 24, 2014].

Srinivasan, Baliji, et al., U.S. Appl. No. 14/993,999, filed Jan. 12, 2016.

Srinivasan, Balaji, "A bitcoin miner in every device and in every hand", May 18, 2015, URL: https://medium.com/@21dotco/a-bitcoin-miner-in-every-device-and-in-every-hand.

Tucker, Toph, et al., "Interactive Demonstration: This Is How You Mine Some Bitcoin", Bloomberg Businessweek, Jan. 13, 2014.

\* cited by examiner

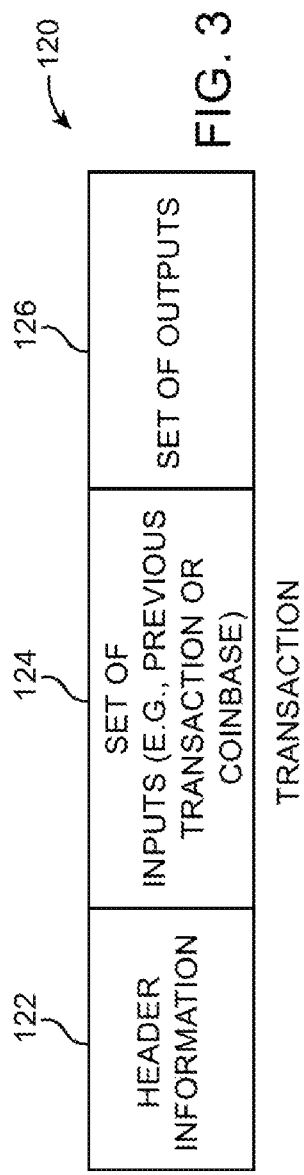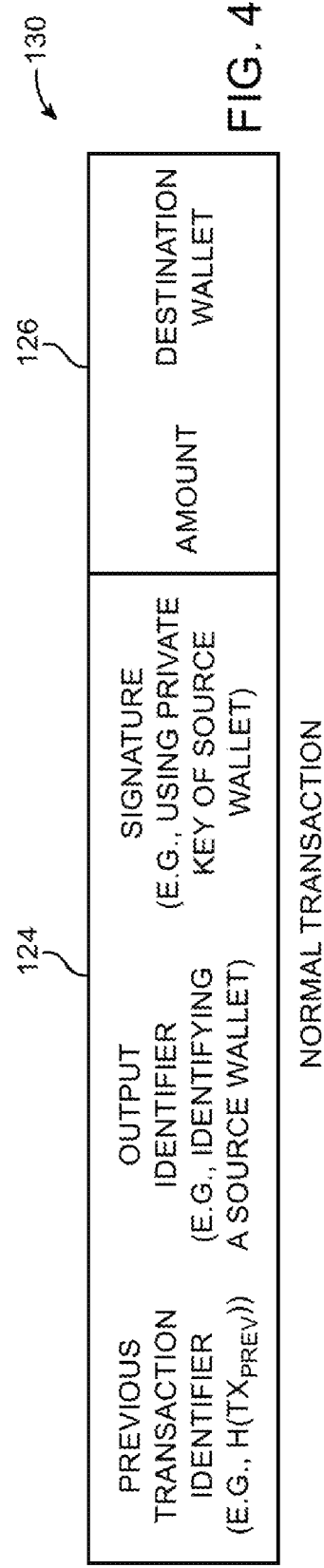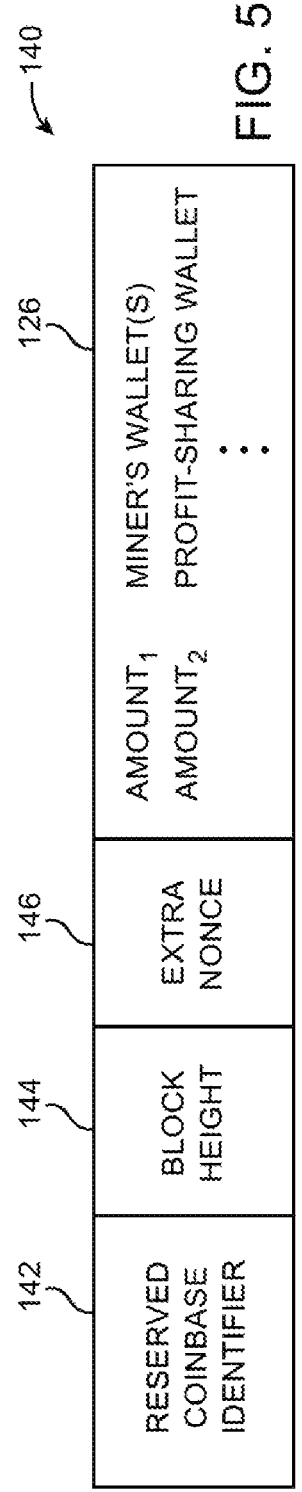

ELECTRONIC DEVICES HAVING EMBEDDED CIRCUITRY FOR ACCESSING REMOTE DIGITAL SERVICES

CROSS-REFERENCE TO RELATED APPLICATIONS

This application is a continuation of prior application Ser. No. 14/920,524, filed 22 Oct. 2015, which is incorporated in its entirety by this reference.

BACKGROUND

This relates to electronic devices, and more particularly, to electronic devices having processors that, with the aid of digital cryptocurrency, access remote digital services.

Electronic devices include processors that use power to run one or more applications. Applications on electronic devices include software applications such as image processing applications, networking applications, and other applications. The software applications often interface with corresponding external servers over the internet (i.e., web servers that support the software applications).

The processors perform processing operations on digital data during normal operation of the electronic device. The processing operations are typically limited by the processing power of the corresponding processor. In some scenarios, the processor provides the digital data to an external server that is remote from the electronic device (i.e., over the internet). The external server has greater processing power than the processor on the electronic device. The external server performs digital services such as computationally intensive processing operations on the digital data received from the electronic device. In this way, the electronic device outsources processing operations to the external server that would otherwise be too computationally-intensive for the processor on the device.

In practice, outsourcing processing operations to external servers can become excessively expensive for the operator of the external server and/or for the user of the electronic device.

SUMMARY OF THE INVENTION

An electronic device may include storage and processing circuitry that is configured to run one or more applications. The electronic device may include embedded cryptocurrency mining circuitry that generates cryptocurrency rewards by computing solutions to a cryptographic puzzle according to a cryptocurrency protocol that is maintained by a cryptocurrency network. For example, the mining circuitry may perform cryptographic hashing operations according to the cryptocurrency protocol to generate the cryptocurrency rewards. The cryptocurrency rewards may be stored in a first digital wallet associated with a user of the electronic device. The cryptocurrency protocol may include the Bitcoin protocol maintained by the Bitcoin network. The cryptocurrency rewards may include bitcoin rewards.

The processing circuitry may maintain information identifying the first digital wallet. For example, the processing circuitry may maintain a hardcoded public key of a cryptographic public-private key pair associated with the user. The processing circuitry may identify digital data upon which remote digital services such as remote processing services are to be performed. The remote processing services may, for example, involve processing power that far exceeds the capabilities of the processing circuitry on the device. The processing circuitry may identify a remote processing network (e.g., a digital services network that is separate from the device such as a cloud network of computing devices) that performs the remote processing services. The processing circuitry may identify a second digital wallet associated with the remote processing network. For example, the circuitry may identify a public key of a public-private key pair associated with the remote processing network.

The processing circuitry may generate a cryptocurrency transaction based on the first and second digital wallets. For example, the processing circuitry may include information identifying the first digital wallet (e.g., a public key of the user) in a source field of the transaction. The processing circuitry may include information identifying the second digital wallet (e.g., a public key of the remote processing network) in a destination field of the transaction. Communications circuitry in the electronic device may transmit the identified data upon which the remote processing services are to be performed to the remote processing network. The communications circuitry may transmit the transaction to the cryptocurrency network for purchasing access to the remote processing services from the remote processing network. The cryptocurrency network may verify the transaction and may provide transaction confirmation information to the remote processing network. The remote processing network may perform the remote processing operations in response to receiving the transaction confirmation.

In one example, the electronic device may include camera circuitry that captures image data. The image data may be transmitted to a remote image processing network that performs image processing operations on the captured image data in response to receiving the transaction confirmation. In another example, the electronic device may include environmental sensor circuitry that captures sensor data. The sensor data may be transmitted to a remote environmental monitoring service provider network that performs processing operations on the captured sensor data in response to receiving the transaction confirmation.

In accordance with any of the above embodiments, the communications circuitry may transmit information verifying that the embedded mining circuitry is performing cryptographic mining operations to cryptocurrency mining pool manager equipment. The mining pool manager equipment may distribute a cryptocurrency rewards share to the user's digital wallet. The pool manager equipment may provide control signals to the device to control the embedded mining circuitry to perform desired cryptocurrency mining operations. The communications circuitry may communicate with the pool manager equipment via a first network link. If desired, the communications circuitry may transmit a request for access to a second network link to access point equipment. The processing circuitry may include a public key associated with the access point equipment in the transaction to purchase access to the second network link from the access point equipment. The second network link may be a higher speed data link than the first network link (e.g., the second network link may have a higher data rate than the first network link).

In accordance with any of the above embodiments, a system may be provided in which an electronic device is communicably coupled to network access point equipment. The storage and processing circuitry on the electronic device may generate a transaction based on information about the digital wallet of the user and information about a digital wallet associated with the network access point equipment. The network access point equipment may receive transaction confirmation information identifying that the transaction has been successfully verified by the cryptocurrency network. In response to receiving the transaction confirmation information, the network access point equipment may establish a communications link between the electronic device and a communications network such as the internet. The electronic device may communicate with mining pool management equipment via an additional communication link having a slower data speed than the communication link established by the network access point equipment. In this way, the electronic device may both generate cryptocurrency and consume the generated cryptocurrency in obtaining access to remote digital services.

Further features of the invention, its nature and various advantages will be more apparent from the accompanying drawings and the following detailed description of the preferred embodiments.

BRIEF DESCRIPTION OF THE FIGURES

FIG. 3 is an illustrative transaction of digital currency that may be verified with mining circuitry in accordance with an embodiment of the present invention.

FIG. 4 is an illustrative transaction of digital currency between source and destination wallets that may be verified using cryptographic hashing circuitry running on mining circuitry in accordance with an embodiment of the present invention.

FIG. 5 is an illustrative coinbase transaction in which a portion of a reward amount is assigned to one or more different wallets in accordance with an embodiment of the present invention.

DETAILED DESCRIPTION

Figure 1:
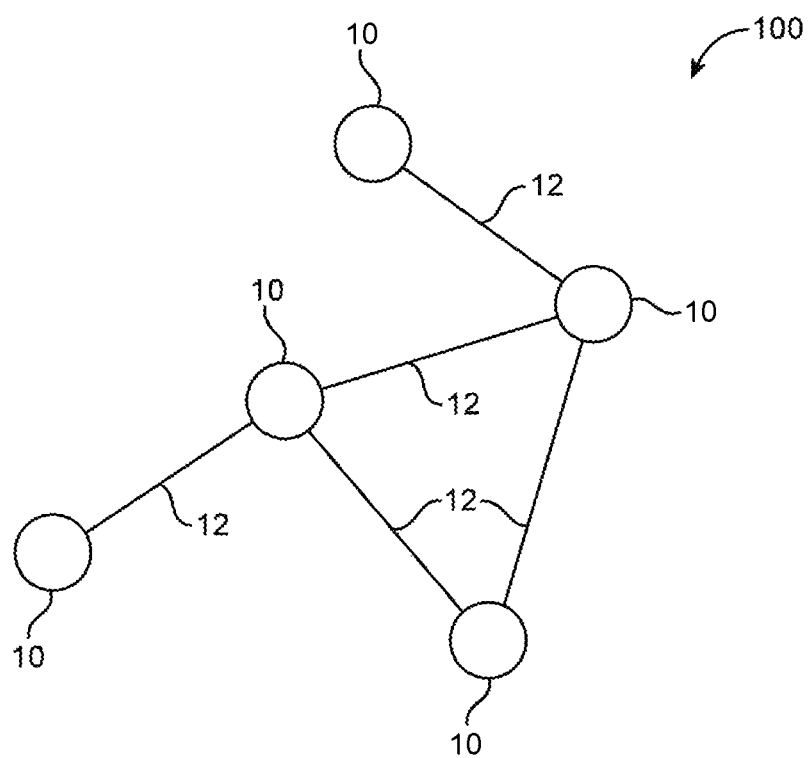
FIG. 1 is an illustrative diagram of a network of nodes having cryptographic hashing circuitry that may be used to mine digital currency in accordance with an embodiment of the present invention.

Digital currencies serve as a digital medium of exchange in which the digital currencies may be transferred in exchange for goods and services. Cryptocurrencies are examples of digital currencies in which cryptography governs the creation and exchange of value. An example of a crypto-currency is the bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network. The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Verified transactions and newly created bitcoins are recorded in the public ledger. The public ledger serves as an official history of transactions. The amount of cryptocurrency owned by any entity may be determined from the public ledger.

Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). Searching for solutions to the cryptographic puzzle involve performing cryptographic hashing functions and other cryptographic operations that are often computationally taxing. The difficulty of the cryptographic puzzle has led to the use of dedicated circuitry designed specifically for Bitcoin mining. If desired, such dedicated circuitry may be embedded within the hardware of other electronic devices that are used to perform other functions for a corresponding user that are not directly related to Bitcoin mining.

The present invention relates to electronic devices having digital transaction capabilities, and, more particularly, to electronic devices having embedded cryptographic hashing circuitry for mining cryptocurrencies such as Bitcoin that are used to make digital transactions. Mining circuitry and mining operations described herein may be used for any digital medium of exchange such as digital currencies, credits, rewards, or points.

While the example of using circuitry to perform cryptographic operations for mining cryptocurrencies is sometimes described herein as an example, in general, the systems and methods described herein may be applied to any desired system for performing cryptographic operations such as cryptographic hashing operations (e.g., for encrypting or decrypting sensitive data, for protecting communications prior to data transmission of an unsecure medium, for obscuring or scrambling sensitive data, etc.).

In the example where cryptographic operations are performed for maintaining or mining a digital cryptocurrency, a network of peers (nodes) may be provided that maintain and/or mine the digital crypto-currency according to a crypto-currency protocol such as the Bitcoin protocol. FIG. 1 is an illustrative diagram of a peer-to-peer network 100 that may operate according to the Bitcoin protocol. Network 100 includes nodes 10 that are coupled to other nodes via paths 12. Nodes 10 may be electronic devices such as desktop computers, laptop computers, cellular telephones, servers, or other electronic devices that implement the Bitcoin protocol. Each node 10 may communicate with other nodes of network 100 over paths 12. Paths 12 may, for example, include network paths such as network cables and packet forwarding devices (e.g., switches, routers, etc.) that couple nodes 10 to other nodes. This example is merely illustrative. Nodes 10 of network 100 may be coupled via any desired underlying communications technology such as wired or wireless network technologies and network 100 may include any desired number of nodes (e.g., tens, hundreds, thousands, millions, or more).

Nodes 10 may communicate over paths 12 according to the Bitcoin protocol in maintaining the cryptocurrency. For example, nodes 10 may communicate to maintain a global ledger of all official transactions. Each node 10 may store a copy of the global ledger (e.g., a complete copy or only a partial copy). Transactions added to the global ledger by each node 10 may be verified by other nodes 10 to help ensure validity of the ledger.

Figure 2:
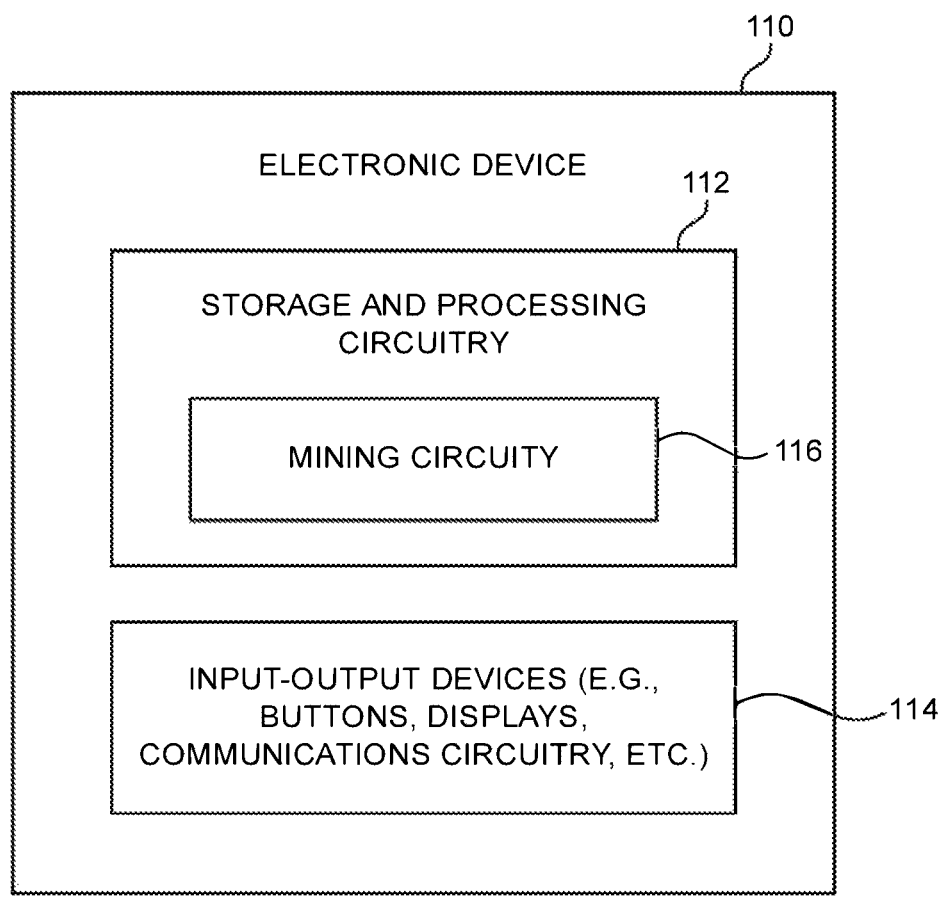
FIG. 2 is an illustrative diagram of an electronic device that may include cryptographic hashing circuitry in accordance with an embodiment of the present invention.

FIG. 2 is an illustrative diagram of an electronic device no that may serve as a node in a peer-to-peer network (e.g., as a node 10 of FIG. 1). As shown in FIG. 2, device no may include storage and processing circuitry 112. Storage and processing circuitry 112 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 112 may be used to control the operation of device no. This processing circuitry may be based on one or more general purpose processing circuits such as microprocessors, microcontrollers, and digital signal processors, or dedicated processing circuits such as application specific integrated circuits, etc.

Device no may be provided with input-output devices 114 such as buttons, speakers, microphones, displays, and other input-output devices that accommodate user interaction with device no. Input-output devices 114 may include communications circuitry for communicating with other devices (e.g., other nodes of a cryptocurrency network). Mining circuitry 116 may perform mining operations such as verifying cryptocurrency transactions (e.g., while sharing any rewards or the mining operations between multiple entities such as a user of the device). Mining circuitry 116 may record the rewards in the global ledger. Mining circuitry 116 may, for example, be an integrated circuit chip. Electronic device no may include one or more of these chips that may be operated together or independently.

Electronic device no may be a desktop computer, a server in a rack-based system, a portable electronic device such as a tablet computer, laptop computer, or a cellular telephone. These examples are merely illustrative. Mining circuitry 116 may be provided to any desired electronic device that can communicate with other nodes of a cryptocurrency network. For example, a flash drive that connects with a computer may be provided with mining circuitry 116. In this scenario, the mining circuitry 116 may operate to perform mining operations by utilizing computer resources when the flash drive is connected to a computer (e.g., by utilizing power from the computer and a network connection between the computer and nodes of a cryptocurrency network).

FIG. 3 is a diagram of an illustrative cryptocurrency transaction 120 that may be verified using mining circuitry such as circuitry 116 of FIG. 2. As shown in FIG. 3, transaction 120 may include header information 122, a set of one or more inputs 124, and a set of one or more outputs 126.

Header information 122 may include one or more header fields including information that helps to identify the transaction. For example, the header fields may include a version number identifying the version of the Bitcoin protocol that is used. As another example, the header fields may include a current timestamp and/or other information on the transaction.

Digital currency may be stored in digital wallets that serve as sources or destinations of transactions. For example, a transaction may transfer funds from a source wallet to a destination wallet. Digital wallets may be formed using any desired data structure and may sometimes be referred to as digital accounts. Wallets may be identified using encryption schemes such as public-key cryptography in which a public-private key pair is assigned to each wallet. The public key of a wallet may serve to publicly identify the wallet (e.g., a public address to which funds may be directed), whereas the private key may be used by the owner of the wallet to sign transactions (e.g., thereby verifying the authenticity of the transactions).

Transaction 120 may identify an input 124 (e.g., a source of funds) and a set of outputs 126 (e.g., destinations). The inputs and outputs may, for example, be digital wallets in which currency is stored. The inputs may refer to an output of a previous transaction as a source of funding or may identify that transaction 120 is an originating transaction that creates new currency (sometimes referred to as a coinbase transaction).

FIG. 4 is a diagram of an illustrative transaction 130 that transfers currency from a source wallet to a destination wallet. Transaction 130 may be, for example, a data packet or sequence (stream) of data packets having corresponding header fields 124 and 126. As shown in FIG. 4, input 124 may include a previous transaction identifier, an output identifier, and a signature. If desired, header information 122 of FIG. 3 such as version number or timestamp information may be included in the transaction of FIG. 5.

The previous transaction identifier may identify which transaction of the global ledger contains the source wallet. The previous transaction identifier may, if desired, identify the previous transaction TXPREV by a hash (e.g., H(TX-PREV)) or double-hash (e.g., H(H(TXPREV)) or DH(TX-PREV)) of the previous transaction. The output identifier may identify which output of the identified previous transaction serves as the source wallet of transaction 130. For example, the outputs 126 of the previous transaction may be enumerated and the index of the source wallet may serve as the output identifier.

Transaction 130 may be signed to help ensure authenticity of the transaction. For example, the private key of the source wallet may be used to encrypt transaction 130 or a portion of transaction 130 to generate the signature that is stored in transaction 130. The public key of the source wallet may be used by others (e.g., other network nodes) to decrypt the signature and confirm the authenticity of the transaction.

The set of outputs 126 identifies one or more destination wallets and a respective amount to transfer from the source wallet to each destination wallet. In the example of FIG. 4, the transaction includes one destination wallet and a corresponding amount to be transferred from the source wallet to the destination wallet. Multiple destination wallets (e.g., two, three, four, or more) may be listed along with corresponding amounts to be transferred to each destination wallet from the source wallet. If desired, the source wallet identified by input 124 may also be listed as a destination wallet. For example, the amount to be transferred to the destination wallet may be less than the amount identified by the output of the previous transaction as belonging to the source wallet. In this scenario, the difference between the amount of the source wallet and the transfer amount may be assigned to the source wallet as an additional output entry. If desired, the amount assigned in outputs 126 to the source wallet may be less than the difference between the originally stored amount and the transfer amount. In this scenario, the difference between original source amount and the sum of amounts in output 126 may serve as additional reward for any miner that verifies the transaction (e.g., in addition to any predetermined reward defined by the cryptocurrency protocol).

FIG. 5 is an illustrative diagram of an originating transaction (i.e., coinbase transaction) that may generate new digital currency. As shown in FIG. 5, transaction 140 includes information that identifies the transaction as a coinbase transaction. The information may include a reserved coinbase identifier 142, a block height 144, and an extra-nonce value 146. If desired, header information 122 of FIG. 3 such as version number or timestamp information may be included in the transaction of FIG. 5.

Reserved coinbase identifier 142 may be a value that is reserved for coinbase transactions. Block height 144 may help identify where the coinbase transaction is located within the global ledger (e.g., which block of a block chain that represents the global ledger). Extra-nonce value 146 is an arbitrary value that may be modified during mining operations.

In contrast to normal transactions such as transaction 130 of FIG. 4, coinbase transaction 140 does not provide a source of funds for outputs 126. Instead, coinbase transaction 140 may create new currency. The amount of new currency created is determined by the cryptocurrency protocol. For example, nodes of the cryptocurrency network may communicate and establish an agreed-upon reward that is created for verifying transactions. The agreed-upon reward may be determined based on the size of the global ledger (e.g., how many recorded blocks are in the global ledger). As an example, the reward for verifying and recording transactions in the Bitcoin protocol may reward a number of bitcoins (units of currency) such as 25 bitcoins. This example is merely illustrative, as the number of bitcoins rewarded may be less than 25 (e.g., 12.5, 6.25, etc.) or may even be zero.

In some scenarios, transactions that are verified using mining circuitry may include fees. For example, transaction 130 of FIG. 4 may assign fewer bitcoins to destination wallets than contained in the source wallet. In this scenario, the remainder may serve as fees (e.g., an additional reward) for a miner. This additional reward may be assigned to the miner's wallet in coinbase transaction 140 or may also be partitioned by the mining circuitry between the miner's wallets and other wallets (e.g., profit-sharing wallets such as wallets owned by a cryptocurrency mining pool manager).

Figure 6:
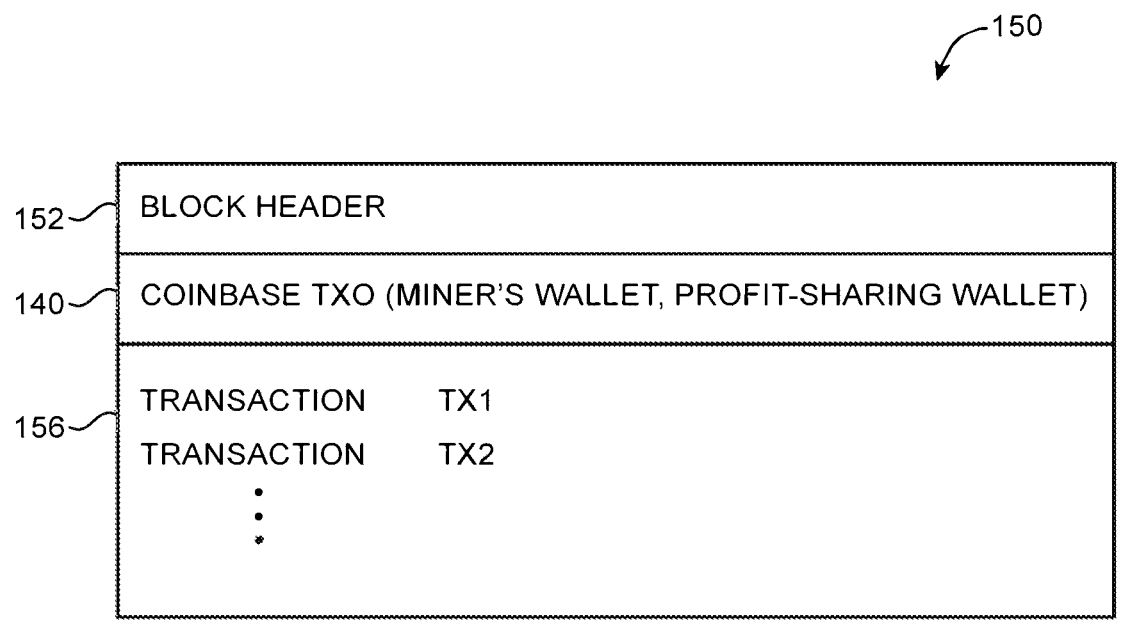
FIG. 6 is an illustrative block that may be generated by mining circuitry and recorded in a global ledger in accordance with an embodiment of the present invention.

In performing mining operations to verify and record a set of transactions, mining circuitry may generate a block to be recorded in the global ledger as shown in FIG. 6. Block 150 of FIG. 6 may include block header 152, coinbase transaction TX0 (e.g., a coinbase transaction 140), and a set of transactions 156 to be recorded.

Figure 7:
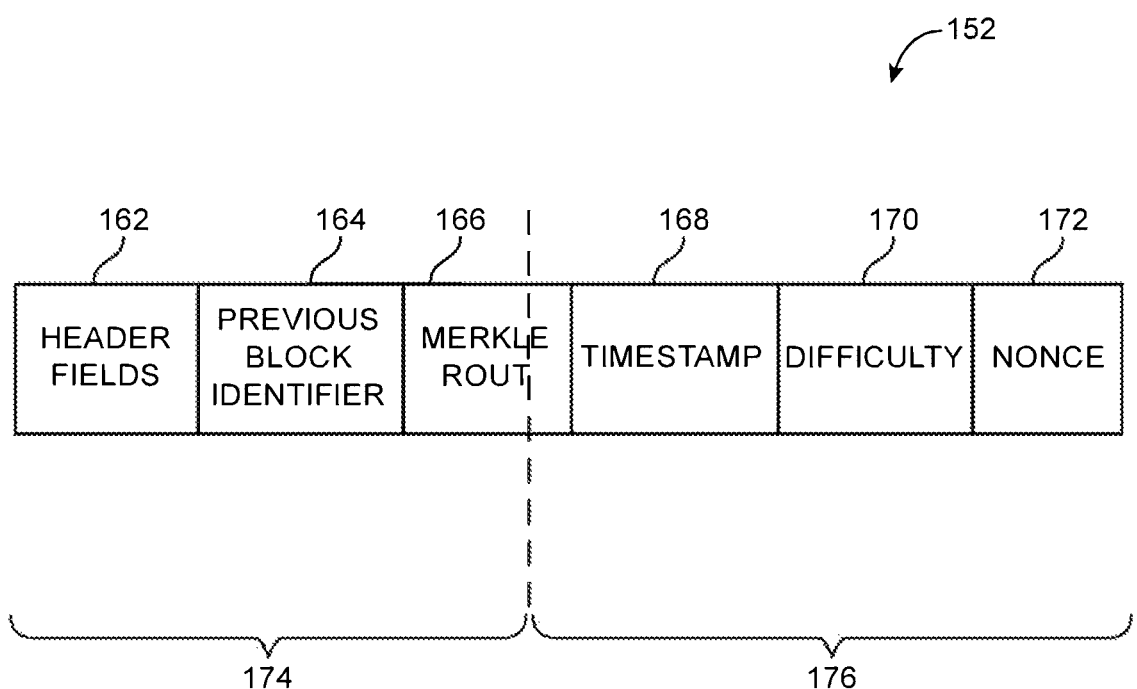
FIG. 7 is an illustrative block header that may be generated by mining circuitry in solving a cryptographic puzzle in accordance with an embodiment of the present invention.

Block header 152 may include information that identifies block 150 and additional information generated by the mining circuitry to complete a function such as information satisfying a cryptographic puzzle. The additional information may be generated to solve the function (e.g., puzzle) for a given set of function inputs that are at least partially determined by block header 152 and for a desired output or range of outputs. FIG. 7 is a diagram of an illustrative block header 152. As shown in FIG. 7, block header 152 may include header fields 162, a previous block identifier 164, a Merkle root 166, a timestamp 168, a difficulty value 170, and a nonce value 172.

Header fields 162 may include any desired header fields such as a version number of the Bitcoin protocol. Previous block identifier 164 may identify a previous block in the global ledger (e.g., the global ledger may be a chain of blocks 152 in which each block references a previous block in the chain). For example, the previous block identifier may be a hash of the block header of the previous block.

Merkle root 166 may be generated from the transactions of block 150 including coinbase transaction 140 and the set of transactions 156. Merkle root 166 may provide a compact representation of the transactions in block 150. For example, Merkle root 166 may be a 256-bit (32 Byte) value, whereas the transactions of block 150 may be hundreds, thousands, or millions of bytes.

Difficulty value 170 is a parameter of the function (e.g., cryptographic puzzle) that is solved with block 150. For the Bitcoin protocol, the cryptographic puzzle involves generating block header 152 such that the hash of block header 152 is less than a predetermined value. The hash may be calculated using a protocol-determined hash function such as the Secure Hash Algorithm (SHA). The predetermined value may depend on difficulty value 170. For example, difficulty value 170 may specify how many leading zeros in a binary data representation are required in the hashed block header value.

Mining circuitry 116 may adjust one or more of the fields in block header 152 in order to provide block header 152 with a hash value that solves the cryptographic puzzle (e.g., a sufficiently small hash value). For example, the mining circuitry may adjust the nonce value or the timestamp value. As another example, the mining circuitry may adjust the extra-nonce value in the coinbase transaction of the block, which indirectly adjusts the Merkle root. Mining circuitry 116 may perform an exhaustive search by iterating over all possible solutions to the cryptographic puzzle.

Hash functions used by the cryptographic puzzle may operate in sequential steps (sometimes referred to herein as stages) on block header 152. If desired, a first portion 174 of block header 152 may be processed in a first hashing stage, whereas a second portion 176 of block header 152 may be processed in a second, subsequent hashing stage. Each hashing stage may involve a number of so-called rounds of logical operations. Each round of logical operations may involve the same logical functions (e.g., operating on different inputs for each round). For example, the output of a given round of logical operations in the hashing function may serve as an input for a subsequent round of the logical operations. The logical operations may iteratively be performed in this way to produce an output of the hashing function. For example, when a Secure Hashing Algorithm (SHA) 256 function is used, second portion 176 of block header 152 may be operated on by 64 rounds of SHA-256 before producing a hash output (e.g., an initial input to logical circuitry implementing the SHA-256 hashing algorithm may be operated on by the logic circuitry and provided as an input to a subsequent round of logic circuitry identical to the previous round of logical circuitry, and so on until the desired number of rounds of logic functions have been performed). This example is merely illustrative. The number of rounds of hashing may depend on the hashing algorithm performed by mining circuitry 116.

Portion 174 may include header fields 162, previous block identifier 164, and a first portion of Merkle root 166, whereas portion 176 may include a second portion of Merkle root 166, timestamp 168, difficulty value 170, and nonce value 172. The SHA function may produce an output value for the first stage based on portion 174 of block header 152. The output value of the first stage may serve as an input to the second stage of the SHA function along with portion 176 of block header 152. The second stage of the SHA function may produce the hash value of block header 152. The SHA function may be implemented using dedicated hardware circuitry on mining circuitry 116.

Figure 8:
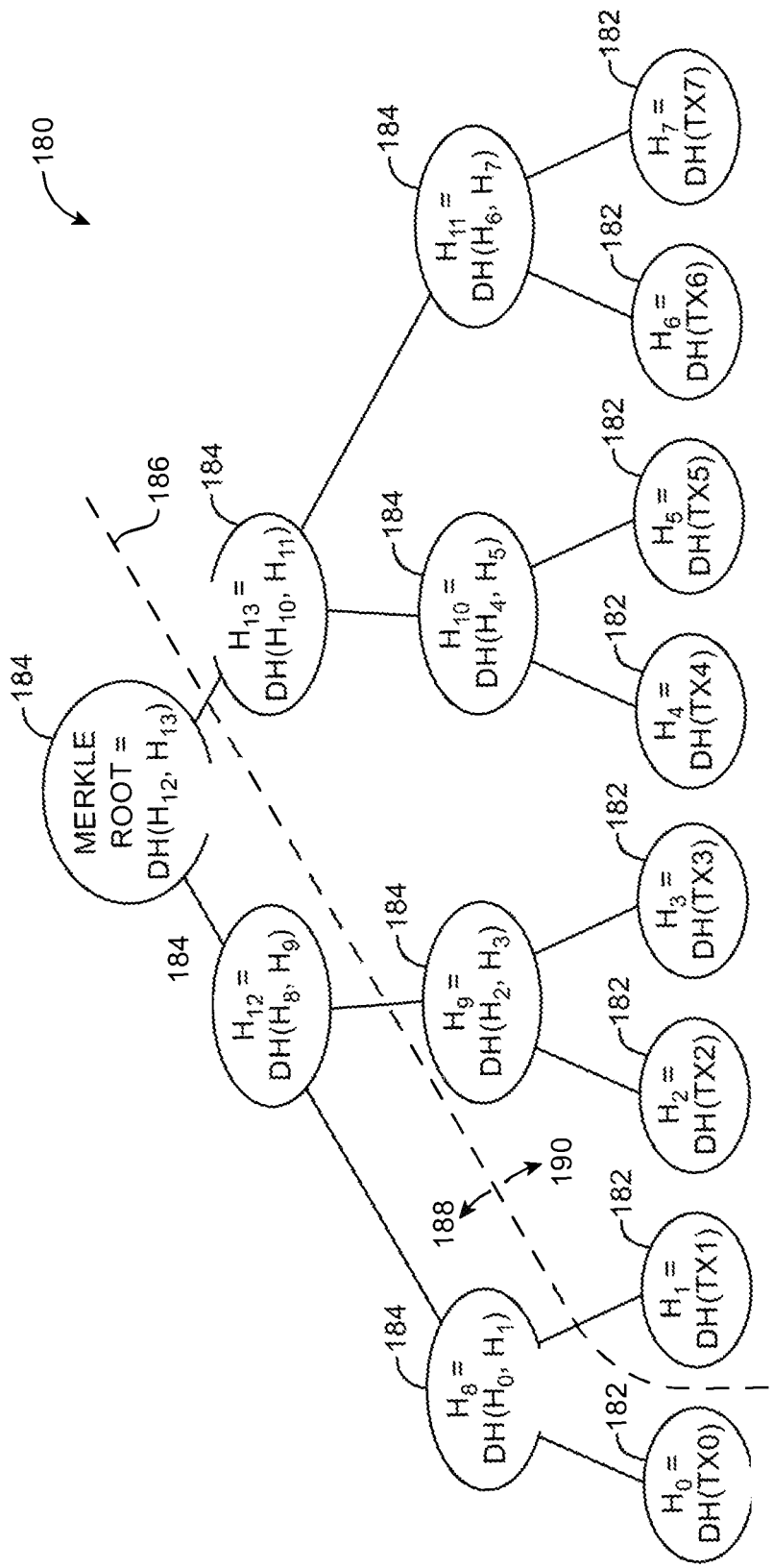
FIG. 8 is an illustrative Merkle tree that may be calculated by mining circuitry from a set of transactions in solving a cryptographic puzzle in accordance with an embodiment of the present invention.

Merkle root 166 may be computed by generating a Merkle tree from the transactions of the corresponding block 150. FIG. 8 is a diagram of an illustrative Merkle tree 180 generated from a block including transactions TX0, TX1, TX2, TX3, TX4, TX5, TX6, and TX7. The example of FIG. 8 in which the block includes eight transactions is merely illustrative. A Merkle tree may be computed from any binary number of transactions (e.g., 2, 4, 6, 8, etc.). If a block does not contain a binary number of transactions, placeholder transactions may be added to complete the Merkle tree. Such placeholder transactions are used only in generating the Merkle tree and are not added to the block.

As shown in FIG. 8, Merkle tree 180 includes leaf nodes 182 that are each generated by computing the double hash of a respective transaction (e.g., using the SHA function). For example, hash value H0 is computed from the (double) hash (DH) of transaction TX0 (e.g., a coinbase transaction), whereas hash values H1, H2, H3, H4, H5, H6, and H7 are computed from transactions TX1, TX2, TX3, TX4, TX5, TX6, and TX7, respectively. Double hash operations may involve performing a cryptographic hashing function H(Z) on an input Z to generate an output Y and performing the same cryptographic hashing function H on the output Y of the first cryptographic hashing function to generate a double hashed output X (e.g., X=H(H(Z))), for example.

Merkle tree 180 may be organized as a binary tree in which each non-leaf node 184 has two child nodes. The nodes of each successive level of the tree may be computed by hashing nodes of a lower (previous) level. The second level of the tree (e.g., the nodes storing hash values H8, H9, H10, and H11) may be generated by double hashing the values stored in leaf nodes 182. For example, hash value H8 is generated by concatenating leaf values H0 and H1 and double hashing the concatenated result. Similarly, the third level of the tree may be generated by hashing the values of the second level (e.g., hash value H12 may be calculated by hashing the concatenation of H8 and H9, whereas hash value H13 may be calculated by hashing the concatenation of H10 and H11). The number of levels in the tree may depend on the number of transactions in the block. In the example of FIG. 8, the root of Merkle tree 180 is at the fourth level and is calculated from hashing values H12 and H13.

The hashed value at each node of Merkle tree 180 has a fixed, predetermined size (e.g., 256 bits), and is dependent on the values at the children of that node. The Merkle root therefore serves as a compact representation of all of the transactions in the corresponding block, because any changes to a transaction percolate upwards to the Merkle root. For example, changes to coinbase transaction TX0 causes hash value H8 to change, which modifies hash value H12, which then modifies the Merkle root value. Similarly, changes to any of the transactions result in changes to the Merkle root value.

Mining circuitry 116 may generate some or all of Merkle tree 180 while searching for solutions to a cryptographic puzzle. For example, in iterating through extra-nonce values in a coinbase transaction TX0, the mining circuitry may need to re-compute the Merkle root for each new extra-nonce value. To help reduce computation time and improve performance, the mining circuitry may re-compute only a portion of Merkle tree 180 during each iteration. In particular, changes to coinbase transaction TX0 only affect hash values H0, H8, H12, and the Merkle root, whereas the remaining nodes of the Merkle tree are unchanged. Dotted line 186 represents the edge of the Merkle tree that separates hash values that need to be recomputed and hash values that remain unchanged when modifying coinbase transaction TX0. Nodes to the left of edge 186 need to be recomputed (portion 188 of tree 180), whereas nodes to the right of edge 186 do not need to be recomputed (portion 190 of tree 180). The mining circuitry can store the constant nodes at edge 186 and reuse the stored values to re-compute the Merkle root. In the example of FIG. 8, hash values H1, H9, and H13 may be stored, whereas the remaining hash values of tree portion 190 do not need to be stored. If desired, nodes to the left of edge 186 may be computed off-chip by circuitry external to mining circuitry 116 (e.g., to save processing time, power, and chip area on mining circuitry 116).

Figure 9:
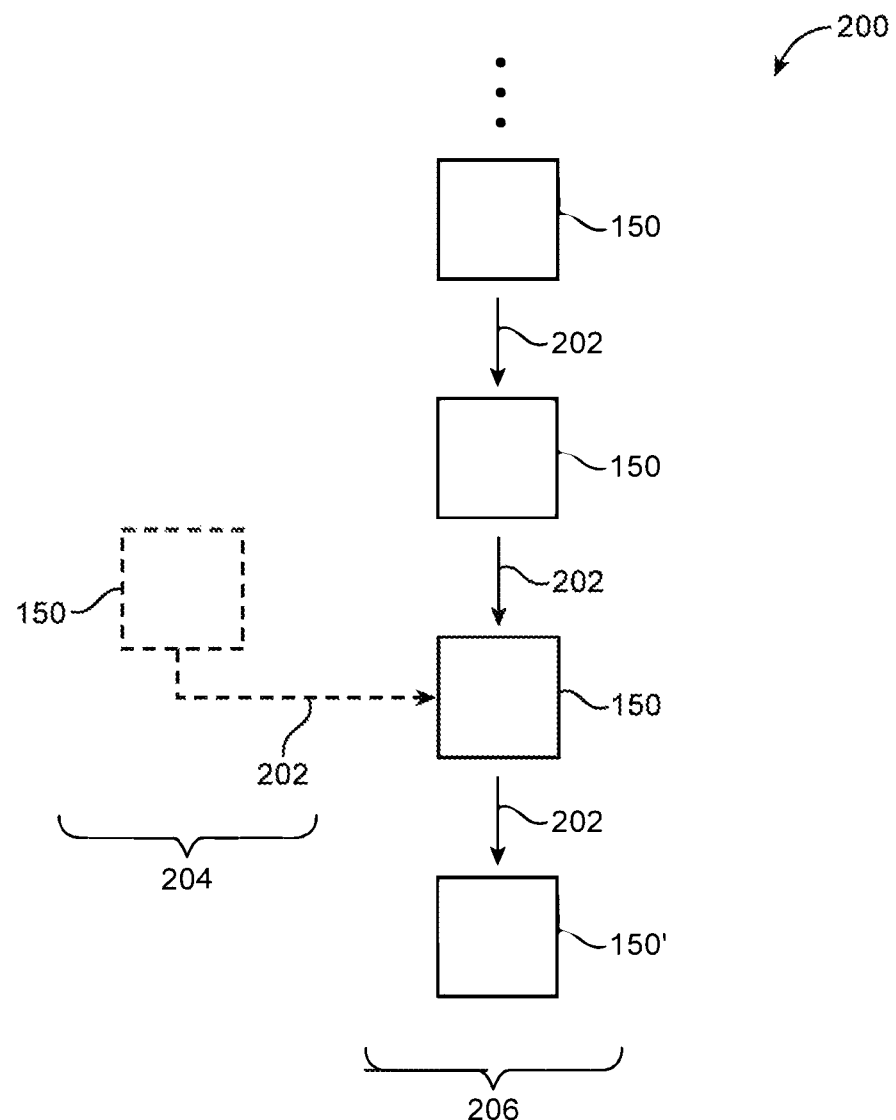
FIG. 9 is an illustrative block chain that may be maintained by a network of nodes as a global ledger of digital currency transactions in accordance with an embodiment of the present invention.

FIG. 9 is an illustrative diagram of a global ledger that is formed from a block chain 200. As shown in FIG. 9, block chain 200 may include an originating block 150' that does not point to any previous block. For example, the previous block identifier 164 of block 150' does not identify any other blocks. Each successive block 150 identifies the previous block in the chain as shown by arrows 202 (e.g., the previous block identifier 164 of each block identifies the previous block in block chain 200).

During mining operations, a device collects a set of transactions that have not already been recorded in block chain 200. The mining circuitry may identify the last (most recently recorded) block in block chain 200. The mining circuitry may subsequently generate a new block 150 from the set of transactions such that the new block includes an identifier 164 that identifies the last block of block chain 200 and solves the cryptographic puzzle of the cryptocurrency protocol used by the block chain.

It is possible for block chain 200 to include multiple branches. For example, branch 204 may be generated when different puzzle solutions are discovered that each have the same previous block identifier. In this scenario, the branch that is longer and includes more blocks serves as the global register. In other words, branch 204 is ignored and the transactions in block 150 of branch 204 are not considered to be recorded, because branch 206 includes more blocks than branch 204 (i.e., four connected blocks in branch 206 compared to only three in branch 204).

Figure 10:
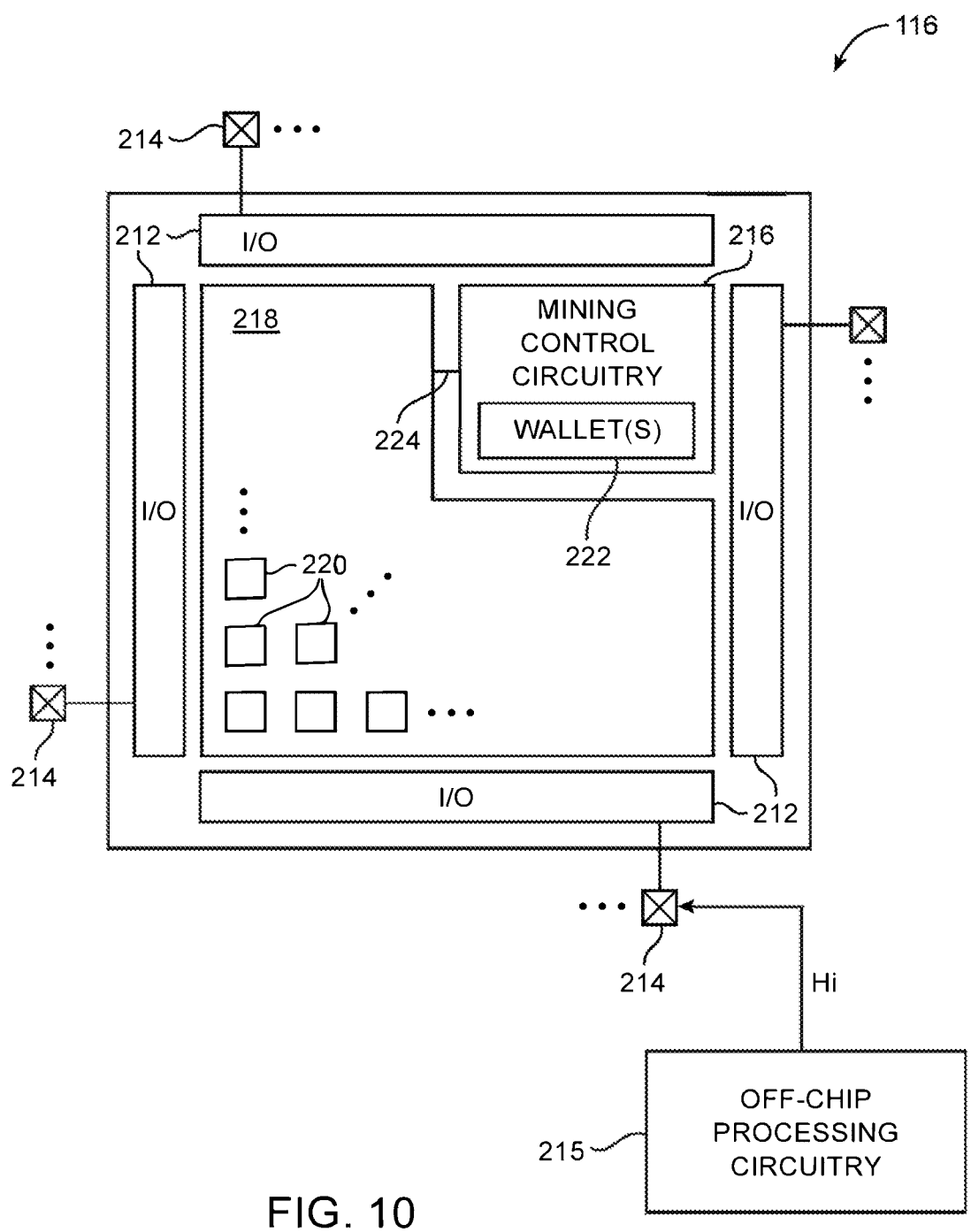
FIG. 10 is an illustrative diagram of mining circuitry for performing cryptographic hashing functions to generate cryptocurrency in accordance with an embodiment of the present invention.

Mining circuitry such as circuitry 116 of FIG. 2 may be implemented as a dedicated integrated circuit (e.g., an application-specific integrated circuit) as shown in the diagram of FIG. 10. As shown in FIG. 10, integrated circuit 116 may have input-output (I/O) circuitry 212 for driving signals off of device 116 and for receiving signals from other devices via input-output pins 214. For example, I/O circuitry 212 and pins 214 may convey signals between mining circuitry 116 and other circuitry on electronic device no of FIG. 2. As shown in FIG. 10, mining circuitry 116 may receive data from off-chip processing circuitry such as processing circuitry 215. Off-chip circuitry 215 may be used to pre-compute portions of the hashing functions performed by circuitry 116. For example, off-chip circuitry 215 may compute hash values of portion 174 of block header 152 as shown in FIG. 7 and may provide the hash value (e.g., hash value $H_i$) to circuitry 116. Circuitry 116 may use hash value $H_i$ as an input when performing hashing functions on portion 176 of block header 152.

Mining circuitry 116 may include a core region 218 and control circuitry 216 that is coupled to the core region by paths 224 such as interconnect paths. Core region 218 may include multiple core circuits 220 that may be controlled by control circuitry 216 to identify solutions to a cryptographic puzzle. For example, each core circuit 220 may include dedicated logic that performs a cryptographic algorithm such as the SHA function on inputs provided by control circuitry 216 over paths 224. Core region 218 may include any desired number of core circuits that are operated in parallel by control circuitry 216 (e.g., tens, hundreds, or more core circuits).

The inputs provided by control circuitry 216 to a given core 220 may include a partially filled block header. For example, the partially filled block header may include header fields 162, previous block identifier 164, a current time, and difficulty value 170. The inputs may include the Merkle root of the transactions of the block to be solved, the transactions themselves, or sufficient information for computing the Merkle root (e.g., Merkle tree edge 186 of FIG. 8). The inputs may include initial hash values $H_i$ computed by off-chip processing circuitry 215. The remaining fields of the block header and block may be generated by core 220 in attempting to solve the cryptographic puzzle with inputs provided by the control circuitry.

Control circuitry 216 may partition the search space of possible solutions to the cryptographic puzzle and assign each core circuit 220 a different portion of the search space (e.g., so that multiple core circuits 220 operating in parallel can more efficiently search for solutions to the cryptographic puzzle). The search space may be partitioned based on the inputs provided by the control circuitry to the core circuits. The search space may be partitioned, for example, by assigning different ranges of nonce values 172 to different cores 220, by assigning different ranges of extra nonce values to different cores 220, etc. The search space to be partitioned may, for example, be assigned to circuitry 116 by a cryptocurrency mining pool manager.

If desired, each core circuit 220 in mining circuitry 116 may include dedicated logic that performs cryptographic hash functions such as Secure Hash Algorithm (SHA) functions. For example, cores 220 may perform SHA-2 hash functions (e.g., SHA-256 hash functions that are computed with 32-bit words as a message schedule input to each round of hashing and that outputs 256-bit hash outputs) on inputs provided by control circuitry 216 over paths 224.

Figure 11:
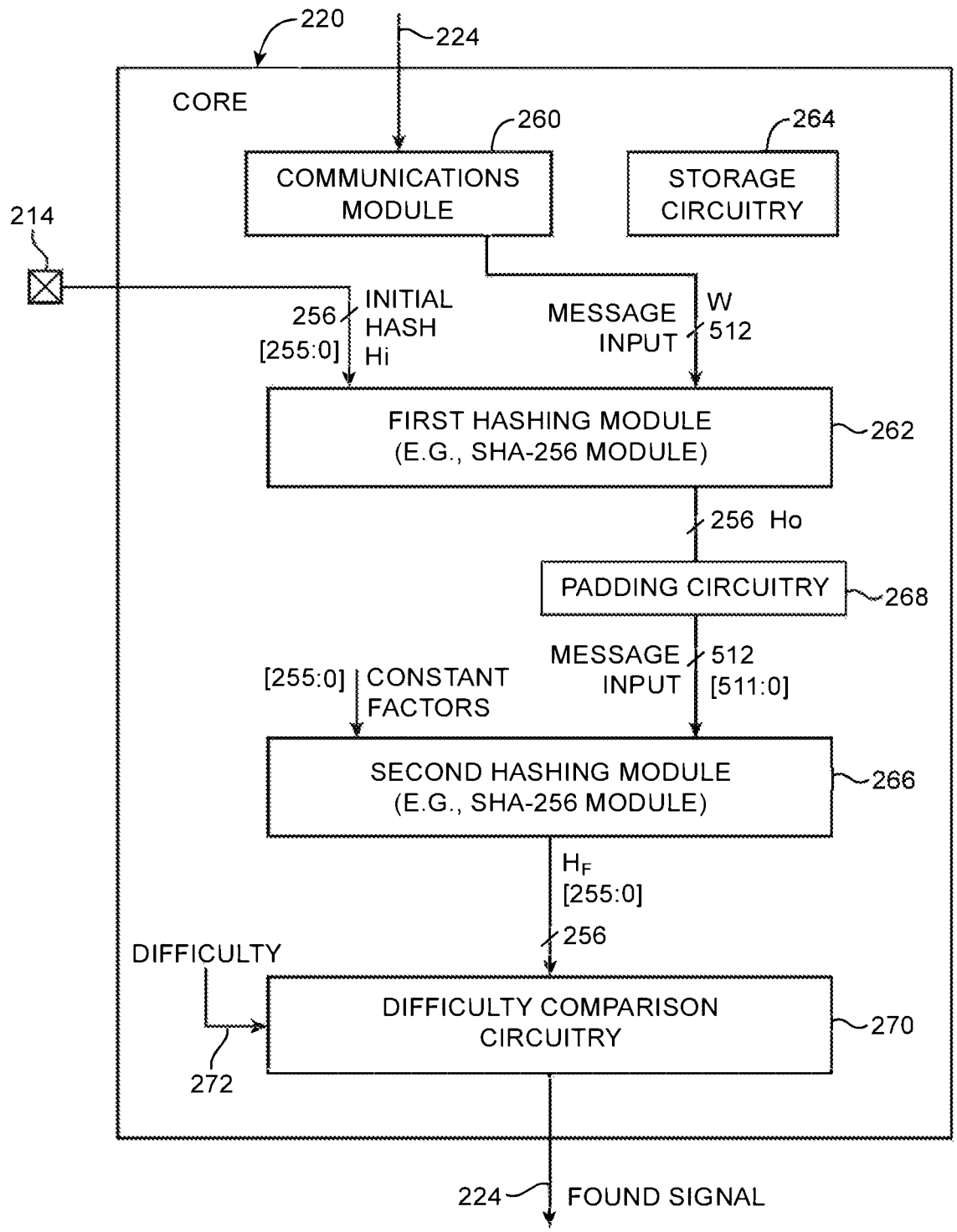
FIG. 11 is an illustrative diagram of a processing core in mining circuitry that may perform rounds of cryptographic hashing (e.g., SHA-256 hashing) in accordance with an embodiment of the present invention.

FIG. 11 is an illustrative diagram of an exemplary core 220 in circuitry 116 of FIG. 10. In the example of FIG. 11, circuitry 220 is used for performing SHA-256 hashing on inputs received from control circuitry 216. However, this is merely illustrative and in general, core 220 may be used to perform any desired hashing algorithm on inputs received from control circuitry 216 (e.g., for use in a Bitcoin protocol, another digital currency protocol, or for use in a cryptographic system unrelated to a digital currency), or core 220 may be formed separate from mining circuitry 116 (e.g., on a dedicated integrated circuit or integrated circuit separate from mining circuitry 116) and may generally perform cryptographic hashing functions (e.g., SHA-256 hashing) on any desired input received from any desired source.

As shown in FIG. 11, core 220 may include communications circuitry such as communications module 260 that receives a message input W from control circuitry 216 via path 224. The message input W received from control circuitry 216 may include portions of block header 152 for use as an input to a SHA-256 hashing algorithm, for example. Core 220 may receive an initial hash input $H_i$ from external circuitry 215 via input/output port 214. The initial hash input $H_i$ may be computed off-chip based on a portion of a bit coin block header. For example, initial hash input $H_i$ may be computed at circuitry 215 by hashing portion 174 of block header 152 (e.g., using single or double hashing with a SHA-256 hashing protocol). Core 220 may include storage circuitry 264 that includes volatile and/or non-volatile memory.

If desired, core 220 may include multiple sequential hashing modules such as first hashing module 262 and second hashing module 266. First and second hashing modules 262 and 266 may be used to perform a double SHA-256 hash based on initial hash $H_i$ and the message input received on line 224. For example, first hashing module 262 (sometimes referred to herein as first SHA-256 module 262) may perform SHA-256 hashing on initial hash $H_i$ and message input W to produce a first hash output $H_o$. The first hash output $H_o$ may be provided as a message input to second hashing module 266 (sometimes referred to herein as second SHA-256 module 266). Second hashing module 266 may receive constant factors as an initial hash input (e.g., constant factors determined by the SHA-256 hashing algorithm such as one or more prime numbers). Second hashing module 266 may perform SHA-256 hashing on the constant factors using a message schedule based on first hash output $H_o$ to produce a second hash output $H_F$ (sometimes referred to herein as a final hash output).

In the example of FIG. 11, initial hash $H_i$ includes 256 bits whereas message input W includes 512 bits. First hash output $H_o$ may include 256 bits (e.g., as determined by the SHA-256 algorithm implemented by first hashing module 262). Core 220 may include padding circuitry 268 for padding first hash output $H_o$ with a desired number of zeros so that padded first hash output $H_o$ includes 512 bits (e.g., so that first hash output $H_o$ can be used as the 512-bit message input to second SHA-256 module 266). The constant factors input to second hashing module 266 may include 256 bits.

Second hash output $H_F$ may include 256 bits (e.g., as determined by the SHA-256 algorithm implemented by second hashing module 266).

Core 220 may include difficulty comparison circuitry 270. Second hash output $H_F$ may be provided to difficulty comparison circuitry 270. Difficulty comparison circuitry 270 may compare second hash output $H_F$ to a predetermined difficulty value received at input 272. Difficulty value 272 may, for example, be received from control circuitry 216 or other desired external circuitry. Difficulty value 272 may, for example, be specified by the digital currency protocol implemented by mining circuitry 116 or by any other source (e.g., the difficulty value may be determined by the network of nodes operating on the Bitcoin protocol and may be adjusted over time so that a predictable number of solutions to the cryptographic puzzles are computed by the entire network in a given time period). If second hash output $H_F$ satisfies the predetermined difficulty value (e.g., if a number of least significant zero bits as specified by the Bitcoin protocol is sufficient or if value $H_F$ is less than the predetermined difficulty value), a found signal may be issued on line 224 indicating that a solution has been found for the given initial hash $H_i$ and message input W (e.g., for the Bitcoin block header associated with the initial hash and message). If no solution is found, the search space may be changed (e.g., using a different timestamp field 168, nonce field 172, extra nonce field, etc.) and computation may be repeated until a solution is found, until the search space is changed, or until a new block 150 in block chain 200 (FIG. 9) is received.

Each hashing module 262 and 266 may perform multiple rounds of SHA-256 hashing (e.g., as specified by the SHA-256 hashing protocol). Each round of hashing may involve performing the same logical functions on an input to that round to produce an output for that round. Each round of hashing may receive a portion of the message input W (e.g., a 32-bit word of the message input or a modified 32-bit word derived from the message input W). The output of a given round may serve as an input for the next round (along with another word from the message input).

In a scenario sometimes described herein as an example (e.g., when operating under the Bitcoin or SHA-256 protocol), first hashing module 262 may perform 64 rounds of hashing based on initial hash $H_i$ and input message W to produce first hash output $H_o$. Similarly, second hashing module 266 may perform 64 rounds of hashing based on the constant factors and first hash output $H_o$ to produce second hash output $H_F$. In typical scenarios, each round of SHA-256 hashing performed by first hashing module 262 (or second hashing module 266) is performed by dedicated logic on core 220. The output of a first round of SHA-256 logic in first hashing module 262 may serve as an input to the second round of SHA-256 logic in first hashing module 262 (along with a word generated by message schedule logic based on input message W), the output of which may serve as an input to a third round of SHA-256 logic in first hashing module 262 (along with an additional word generated by the message schedule logic based on input message W), etc. Each round of SHA-256 performed by first hashing module 262 and second hashing module 266 may be performed on a hash input and a corresponding message input. The hash input and message input may be combined as determined by the SHA-256 protocol to produce a hash output used as a hash input of the subsequent round of SHA-256 hashing. The hash output of the final (e.g., $64^{th}$) round may be output as the hash output value $H_o$ or $H_F$.

The logical operations implemented by the SHA-256 hashing protocol may be performed by dedicated logic hardware (e.g., hardcoded circuitry) on first and second hashing modules 262 and 266, for example. Performing logical operations using hardware may be significantly faster than performing the same logical operations using software.

In practice, it may be difficult for a single device 116 to find solutions to the cryptographic puzzle for generating cryptocurrency rewards for the operator of device 116. In order to increase the likelihood of generating cryptocurrency rewards, multiple users may join a so-called cryptocurrency mining pool. Members (e.g., mining devices operated by users) in a cryptocurrency mining pool work together to solve the cryptographic puzzle. For example, each member of the mining pool may contribute some amount of processing power (e.g., cryptographic hashing power for computing hashing rounds 262 and 266 of FIG. 11) to the mining pool. Each member may, for example, perform searches for solutions to the cryptographic puzzle over a respective search space. By dividing the search space over members of the pool, the pool may collectively find a solution to the puzzle more rapidly than a single member searching for the solution on its own. When one of the members of the pool finds a solution to the cryptographic puzzle (resulting in generation of a corresponding cryptocurrency reward as governed by the cryptocurrency protocol), the rewards may be shared amongst all of the members of the pool. The reward share may serve as an incentive to the members of the pool to contribute processing power to the pool. In this way, even if a given pool member only rarely finds a solution to the cryptographic puzzle, that user can still receive a stream of cryptocurrency earnings on average over time.

Figure 12:
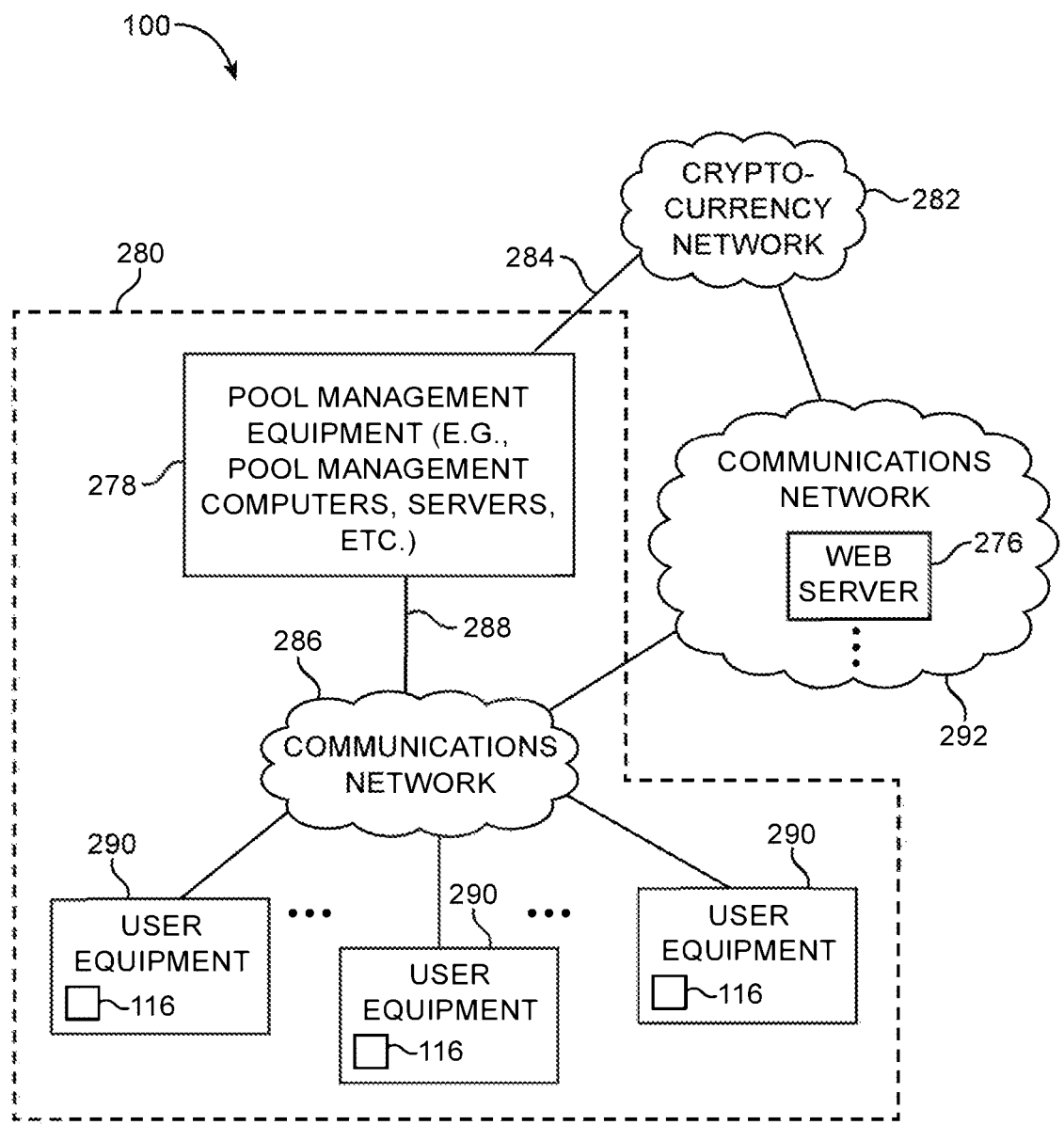
FIG. 12 is an illustrative diagram showing how multiple users may operate cryptocurrency mining equipment in a mining pool for sharing cryptocurrency rewards between the users in accordance with an embodiment of the present invention.

FIG. 12 is an illustrative diagram showing how multiple users may join a mining pool to search for solutions of the cryptographic puzzle and share any corresponding cryptocurrency rewards. Each of the users may own or operate corresponding mining circuitry 116 that searches for solutions of the cryptographic puzzle for generating cryptocurrency rewards (e.g., bitcoin rewards).

As shown in FIG. 12, multiple users may each own and/or operate corresponding user equipment 290 in cryptocurrency mining pool 280. User computing equipment 290 may include mining circuitry 116 operated by a corresponding user. Pool 280 may include any desired number of users 290. For example, pool 280 may include one user 290, two users 290, tens of users 290, hundreds of users 290, thousands of users 290, millions of users 290, etc. Each user 290 may own and operate any desired number of mining circuits 116. For example, each user 290 may operate one mining circuit 116, two mining circuits 116, ten mining circuits 116, hundreds of mining circuits 116, etc. If desired, different users 290 may each operate different numbers of mining circuits having different processing capabilities.

Pool 280 may be managed using pool management equipment 278. Pool management equipment 278 may include, for example, pool management computers (e.g., laptop and/or desktop computers) and/or pool management servers that manage and synchronize operations of mining circuitry 116 in pool 280. Pool management equipment 278 may be owned and/or operated by a pool manager (e.g., a mining pool manager organization or company or a selected user with management privileges).

Each user device 290 in pool 280 may be coupled to pool management equipment 278 via communications network 286 (e.g., a local area network, a wireless local area network, the internet, etc.). Communications network 286 may be coupled to one or more external web servers 276 that do not participate in the mining pool (e.g., over the internet or other communications networks). Web servers 276 may provide processing services and other digital services for devices in pool 280 and for other devices on which embedded cryptocurrency mining circuitry is formed.

Pool management equipment 278 may manage mining operations at user devices 290 and may manage sharing of rewards between users 290. For example, if a first user device 290 finds a solution to the cryptographic puzzle, pool management equipment 278 may ensure that the corresponding rewards are distributed to each user 290 in pool 280. If desired, pool management equipment 278 may receive a share of the rewards generated by users 290 (e.g., a pool management wallet may receive a reward share of cryptocurrency whenever a solution is found by a member 290 or profit-sharing wallets owned by pool manager 278 and located on mining circuits 116 may receive a share of the rewards).

Pool management equipment 278 may serve as an interface between the user equipment of pool 280 and cryptocurrency network 282 (e.g., a network such as network 100 of FIG. 1). Pool management equipment 278 may, for example, assign a respective cryptographic search space for each user 290 (e.g., a corresponding range of nonce values, timestamp values, etc.). Pool management equipment 278 may verify that users 290 are performing their assigned mining duties before providing users 290 with a corresponding rewards share. For example, mining circuits 116 in pool 280 may periodically send confirmation signals to pool management equipment 278 over network 286 verifying that mining circuits 116 are contributing processing power to the mining pool. Cryptocurrency network 282 may include, for example, a network of nodes that maintains the Bitcoin protocol cryptocurrency or any other cryptocurrency protocol.

Pool management equipment 278 may manage sharing of rewards between users 290 using any desired sharing scheme. In one suitable arrangement, rewards are distributed to devices 290 using a weighting scheme in which some users receive more cryptocurrency rewards than other users. For example, management equipment 278 may distribute more rewards to users 290 having greater processing power, that cover a greater solution search space, or that solve the cryptographic puzzles with greater difficulty, than for users 290 having reduced processing power, that cover less solution search space, or that solve easier cryptographic puzzles.

The search space and selected difficulty (e.g., a product of the search space and the selected difficulty) may sometimes be referred to herein as the hashing share of mining circuitry 116. Pool manager 278 may allocate a greater share of the rewards generated by pool 280 to users 290 who operate mining circuitry 116 having a greater hashing share than users 290 operating mining circuitry with a smaller hashing share. As an example, a user that performs 1% of the hashing power of pool 280 may receive 1% of the cryptographic rewards generated by any user in the pool, whereas a user that performs 10% of the hashing power of pool 280 may receive 10% of the rewards. Mining circuitry 116 may inform pool manager 278 of the hashing share that is being performed by mining circuitry 116 or pool manager 278 may otherwise have knowledge of the hashing share of each user. Pool manager 278 may use the information about the hashing share of mining circuitry 116 to assign the appropriate reward share for the user of device 300. By contributing a non-zero hashing share to pool 280, mining circuitry 116 may generate a stream of cryptocurrency rewards even if that user does not solve the cryptographic puzzle.

Pool management equipment 278 may distribute cryptocurrency rewards shares to the wallets of users 290 by generating transactions 130 (FIG. 4). Transactions 130 generated by equipment 278 may include destination fields corresponding to the user wallets of users 290 and having amount fields corresponding to the reward share for each user (e.g., a rewards share proportional to the hashing share of each user). If desired, transactions 130 may include destination fields corresponding to a wallet owned by the operator of pool management equipment 278 so that the operator of management equipment 278 receives a reward share (e.g., as an incentive for maintaining and managing pool 280).

User equipment 290 in pool 280 may include one or more electronic devices. Each instance of user equipment 290 shown in FIG. 12 may include, for example, one electronic device, two discrete electronic devices, or more than two electronic devices. Mining circuits 116 may be formed on any desired number of electronic devices operated by each user 290 (e.g., at least one electronic device operated by each user 290 includes at least one mining circuit 116). User equipment 290 may include some electronic devices that do not include mining circuits, if desired. Mining circuitry 116 may be formed on at least one of the electronic devices in each instance of user equipment 290. If desired, one or more electronic devices in user equipment 290 may perform operations that are not associated with mining cryptocurrency (e.g., the devices of users 290 need not be dedicated solely to performing cryptocurrency mining).

Figure 13:
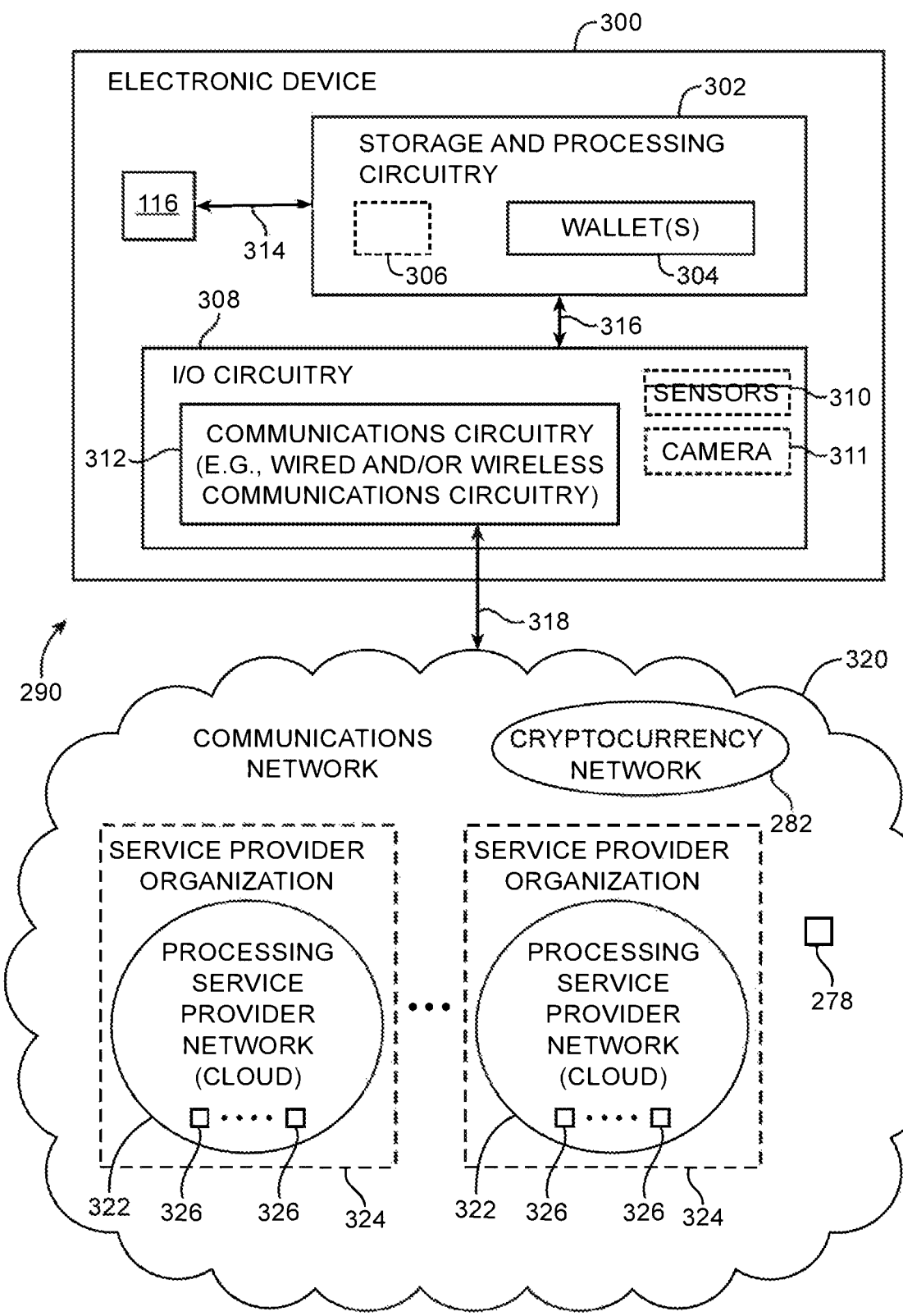
FIG. 13 is diagram of an illustrative electronic device having embedded cryptocurrency mining circuitry for generating cryptocurrency rewards that are used to obtain access to remote digital services in accordance with an embodiment of the present invention.

FIG. 13 is an illustrative diagram showing how mining circuitry 116 may be embedded within an electronic device of user equipment 290 for mining cryptocurrency (e.g., bitcoins). As shown in FIG. 13, electronic device 300 may include storage and processing circuitry 302 (e.g., similar to circuitry 112 of device no as shown in FIG. 2). Storage and processing circuitry 302 may include non-volatile memory, volatile memory, processing circuitry such as one or more central processing units (CPUs), or any other desired storage and processing circuits. Processing circuitry 302 may include software and/or hardware for implementing one or more operating systems such as a mobile operating system or a computer operating system. The operating system may be used to store, access, and modify one or more software applications running on processor 302 (e.g., one or more mobile applications, etc.).

If desired, processing circuitry 302 may include wallet information 304 associated with a cryptocurrency wallet owned by the user 290 of device 300. Wallet information 304 may include address information associated with a digital wallet owned by user 290. For example, wallet information 304 may include a public key and/or a private key of a public-private key pair associated with the digital wallet of user 290. The public keys may serve to authenticate transactions of cryptocurrency into user wallet 304 and may be used to identify wallet 304. Such wallet information may be stored in wallets 304 on processing circuitry 302 and/or on mining control circuitry 216 of FIG. 10 (e.g., as wallets 222). Wallets 222 and/or 304 may be hardcoded into the corresponding circuitry if desired. If desired, wallet information 304 may be stored on processor 302 after calling wallet information 222 from mining circuitry 116. The public keys may be publically known and used by other entities to send cryptocurrency to users 290 using transactions 130. If desired, wallets 304 may include public keys of a digital wallet owned by pool manager 278 (e.g., so-called profit sharing wallets). Public keys associated with pool manager 278 may be used to assign a profit sharing reward to the manager 278 whenever reward shares are provided to the wallet of user 290.

If desired, wallet information 304 (e.g., public keys owned by user 290 and/or pool manager 278) may be hardcoded (hardwired) into circuitry 302. In another suitable arrangement, wallet information 304 may be hardcoded into mining circuit 116 (e.g., such that wallet information 304 shown in FIG. 13 includes instructions for processor 302 to call or otherwise access the hardcoded information from mining circuitry 116). As an example, the public keys of digital wallets 304 may be identified using hardware description language (HDL) such as Verilog in designing the dedicated mining circuitry 116 and/or circuitry 302. In this scenario, design tools such as synthesis tools and place and route tools may be used to convert the HDL description of the dedicated mining circuitry to a circuit layout. The circuit layout may be used to generate a set of photo masks that are used in fabricating the dedicated mining circuitry with the hard-coded public keys (e.g., using fabrication tools such as lithography). In other words, dedicated logic in the mining circuitry and/or processing circuitry may identify wallets. The information in the dedicated logic is generally not accessible to any users. Examples of how wallets may be hardcoded into dedicated profit-sharing mining circuitry or processing circuitry 302 include mask programming, selectively shorting pins of the integrated circuit chip (chip-level hardcoding) or solder bumps of an integrated circuit package (package-level hardcoding) to a positive power supply or a power supply ground, permanently programming fuses or anti-fuses, or storing in non-volatile memory. If desired, hardcoding of wallets may be provided at a board level such as configuring jumpers on a motherboard to which the dedicated profit-sharing mining circuitry is mounted. Hardcoding the wallet information in circuitry 116 and/or 302 may help to protect the wallets (e.g., from being replaced by a user with a different wallet). In another suitable arrangement, wallet information 304 (e.g., corresponding public keys) may be soft-coded into circuitry 116 and/or 302 or stored in volatile or non-volatile memory on circuitry 302.

Wallet information 304 may be used by pool manager 278 to provide rewards shares to user 290 (e.g., by generating a transaction 130 having user wallet 304 as a destination wallet field). Applications running on processor 302 may include instructions on how to access or call wallet information 304 (e.g., wallet information 304 may be exposed to software running on processor 302). Applications running on processor 302 may call wallet information 304 during normal device operation so that shares of cryptocurrency rewards generated by mining circuitry 116 that are assigned to wallet 304 can be used to perform digital transactions in the applications. The digital transactions may be performed with or without acknowledgement from the user of device 300 (e.g., with or without receiving a user input).

Electronic device 300 may include input/output (I/O) devices 308 (e.g., similar to input/output devices 114 of FIG. 2). Input/output circuitry 308 may be coupled to storage and processing circuitry 302 via communications path 316. Input/output circuitry 308 may include any desired I/O devices such as buttons, speakers, microphones, displays, wired ports, touch pad devices, mouse devices, track pad devices, scroll wheels, touch screen devices, audio devices, and other input-output devices that accommodate user interaction with device 300. Input-output devices 308 may include communications circuitry such as communications circuitry 312 for communicating with other devices. Communications circuitry 312 may include, for example, wired communications circuitry and/or wireless communications circuitry.

Wired communications circuitry in I/O circuitry 308 may communicate with external devices via one or more wired paths and using any desired wired communications protocol (e.g., Ethernet protocols, Universal Serial Bus (USB) protocols, etc.). Wireless communications circuitry in I/O circuitry 308 may include wireless transceiver circuitry and antenna circuitry that communicate with external devices via one or more wireless links using any desired wireless communications protocols (e.g., IEEE 802.11 protocols such as the Wi-Fi protocol, Bluetooth protocols, cellular protocols such as Global System for Mobile Communications (GSM) protocols or Long Term Evolution (LTE) protocols, near field communications protocols, or any other desired wireless protocols). For example, communications circuitry 312 may transmit data to and receive data from communications network 320 via path 318. Path 318 may include any desired number of wired and/or wireless links between device 300 and other nodes in communications network 286.

If desired, I/O circuitry 308 may include sensor modules such as optional sensor circuitry 310. Sensor circuitry 310 may gather information about the surroundings of device 300 and may provide the gathered information to processing circuitry 302 for storage and/or additional processing. Sensor circuitry 310 may include, for example, image sensor circuitry, light sensor circuitry, proximity sensor circuitry, atmospheric sensor circuitry (e.g., barometer devices), temperature sensor circuitry, security sensor circuitry (e.g., motion detection or intruder detection circuitry), smoke detector circuitry, carbon monoxide detector circuitry, audio detector circuitry such as a microphone, touch sensor circuitry, or any other desired sensor circuitry. If desired, I/O circuitry 308 may include a camera 311 for capturing digital still and/or video data. Sensors 310 and camera 311 may be omitted from device 300 if desired.

Device 300 may include mining circuitry 116. Mining circuitry 116 may be embedded (e.g., mounted or otherwise integrated) within device 300 and coupled to storage and processing circuitry 302 via communications path 314. Storage and processing circuitry 302 may relay information between mining circuitry 116 and communications network 318 (e.g., via I/O circuitry 308 and paths 316 and 318).

Mining circuitry 116 may include a dedicated mining chip or integrated circuit. For example, mining circuitry 116 and storage and processing circuitry 302 may be formed on two separate integrated circuits, two separate chips, or two separate printed circuit board structures within device 300. In another suitable arrangement, processing circuitry 302 and mining circuitry 116 may be formed on a common integrated circuit, a common chip, or a common printed circuit board structures. I/O circuitry 308 may be formed on a common integrated circuit as mining circuitry 116, on a common integrated circuit as processing circuitry 302, on a common integrated circuit as both mining circuitry 116 and processing circuitry 302, or on a dedicated integrated circuit or chip. Embedded mining circuitry 116, processing circuitry 302, and I/O circuitry 308 may be formed within an electronic device housing if desired. The electronic device housing may include a conductive (metal) housing, a plastic or dielectric housing, or combinations of these or other materials.

If desired, mining circuitry 116 may be integrated within a motherboard structure, within a video card structure, within a networking card structure, within a sound card structure, or otherwise embedded within the hardware architecture of device 300. Mining circuitry 116 may be permanently integrated within the hardware of device 300 such that circuitry 116 is not at any time removable from the hardware of device 300 (e.g., such that circuitry 116 is not at any time removable from the motherboard of device 300, from the soundcard of device 300, from a common integrated circuit with processing circuitry 302 on device 300, from housing 301, etc.). For example, mining circuitry 116 may be integrated within the hardware of device 300 (e.g., within housing 301 or within the components of device 300) during manufacture of device 300 such that mining circuitry 116 cannot possibly be removed during operation of device 300 by an end user. In this way, mining circuitry 116 may be completely embedded or integrated within device 300.

In another suitable arrangement, mining circuitry 116 may be formed from one or more logic regions of processing circuitry 302 as shown by region 306. For example, processing circuitry 302 may include customizable logic circuitry such as a field-programmable gate array (FPGA) having programmable logic that is configured to form mining circuitry 116 (e.g., configured to perform the logical operations of mining circuitry 116). Mining circuitry 116 may be soft-coded or hard-coded as so-called Intellectual Property (IP) blocks within processing circuitry 302. In general, electronic device 300 may include mining circuitry 116 coupled to processor 302 via path 314 and/or mining circuitry at logic region 306.

Device 300 may be any desired electronic device that provides functionality to user 290 that is not directly associated with generating cryptocurrency. For example, device 300 may be a laptop computer, desktop computer, tablet computer, mobile telephone, portable media player, television receiver, television system, security system, cable television receiver, audio system, vehicle system, server device, network router device, environmental monitoring device, adapter device, charger device, power adapter device, or any other electronic device. Device 300 may consume power in performing electronic device functions that are not related to mining cryptocurrencies. For example, in scenarios where device 300 is a mobile telephone, device 300 may consume power to perform telephone calls, to browse the internet, to compose, send, and receive email, to send text messages, to watch video files or streaming video, etc.

Device 300 may also utilize power to perform cryptocurrency mining operations using circuitry 116 (e.g., to generate rewards or reward shares associated with cryptocurrency mining). Device 300 may perform mining operations in the background while performing other device operations or may perform mining operations while device 300 is not being used to perform other device operations (e.g., while device 300 is idle or in a sleep mode or while a user is not actively providing input to the device). In this way, device 300 may continuously or semi-continuously generate a stream of cryptocurrency rewards in real time for a user or owner of device 300, or for any other desired entity having a corresponding wallet 304 maintained on circuitry 302.

Processing circuitry 302 may serve as an interface between mining circuitry 116 and communications network 320. For example, processing circuitry 302 may communicate with pool manager 278 or crypto-currency network 282 via path 318. Processing circuitry 302 may provide information to pool manager 278 identifying that mining circuitry 116 is actively performing mining operations in pool 280 and may provide information to pool manager 278 identifying whether mining circuitry 116 has successfully solved the cryptographic puzzle. If desired, processing circuitry 302 may identify that pool manager 278 has provided cryptocurrency reward shares to wallet 304. If desired, processing circuitry 302 may determine an amount of cryptocurrency available to wallet 304 (e.g., by transmitting key or address information associated with wallet 304 to pool equipment 278).

Processing circuitry 302 (e.g., an operating system on processing circuitry 302) may be able to run one or more software applications that are not used for mining cryptocurrency. The applications running on circuitry 302 may perform data processing operations. The data processing operations may generate processed data using input data. The input data may be received from network 320, from a user of device 300 (e.g., via circuitry 308), from sensors 310, from camera 311, from other applications running on circuitry 302, etc. The data processing operations may be limited by the processing power of circuitry 302 when device 300 was manufactured. For example, some processing operations on input data may prove too computationally taxing to perform using circuitry 302 in a reasonable amount of time or to perform at all. If desired, processing circuitry 302 may utilize remote digital services provided by one or more entities in communications network 320 (e.g., entities remote from device 300) to perform digital services on data generated by device 300. Remote digital services may include, for example, computationally taxing data processing operations that would otherwise be too difficult for processing circuitry 302 to perform itself.

Processing circuitry 302 may transmit data to be processed to communications network 320 via link 318. Communications network 320 may include any desired number of network nodes coupled by communications links such as the internet. Communications network 320 may include cryptocurrency network 282, pool manager node 278 (and other devices from pool 280), web servers 276, or any other desired network nodes or subnetworks. Communications network 320 may include a number of remote digital service provider networks 322 that each perform remote digital services (e.g., remote processing operations) for devices such as device 300. Remote service provider networks 322 may receive data from device 300 and may perform computationally intensive processing operations on the received data (e.g., operations which circuitry 302 is incapable of performing within a reasonable amount of time or at all). Remote service provider networks 322 may transmit the processed data back to device 300 or to any other desired nodes after processing.

Each remote service provider network 322 may be maintained, owned, and/or operated by a corresponding remote service provider organization 324. For example, networks 322 may include an image processing service network 322 owned by an image processing software company 324 that performs computationally taxing image processing operations on data received from device 300, may include a voice recognition service network 322 owned by an audio data processing organization 324 that performs computationally taxing voice recognition operations on data received from device 300, etc. In general, networks 322 may perform any desired digital services for electronic devices 300 having limited processing capabilities.

The example in which remote digital service provider networks 322 perform computationally intensive processing operations for devices 300 is merely illustrative. In general, networks 322 may perform any desired digital services for device 300. Such remote digital services may include, for example, storage of data in one or more databases or servers, maintaining one or more databases, providing access to a database to a user of device 300, providing access to interface software such as a software dashboard to a user of device 300, data logging, providing access to a selected network connection such as a high speed internet connection, performing data processing operations, compiling data, data presentation services, security services such as firewall and virus scanning services, data encryption and/or decryption services, data filtering services, email services, messaging services, or any other desired digital services performed by computing equipment remote from device 300 (e.g., equipment coupled to device 300 via communications network 320 and link 318).

Each remote service provider network 322 may include one or more computing nodes 326 (e.g., desktop computers, laptop computers, mobile computers, servers, etc.). For example, a given service provider network 322 may include a single computer 326 that performs processing operations (e.g., in scenarios where the processing power of computer 326 is significantly greater than the processing power of device 300). In another suitable example, the service provider network 322 may include multiple computing nodes 326 interconnected via communications links (e.g., tens of discrete computing devices, hundreds of discrete computing devices, thousands of computing devices, millions of computing devices, etc.).

Two or more computing nodes 326 of a given service provider network 322 may, if desired, perform digital services for device 300. In an example that is sometimes described herein, service provider 322 performs data processing operations. In this scenario, two or more nodes 326 may perform data processing operations together to increase the total processing power of network 322. For example, a given data processing operation may be divided among multiple nodes 326 (e.g., some or all of nodes 326) so that processors on each node contribute to the processing operation. In this way, service provider network 322 may have a significantly greater total processing power than circuitry 302 on device 300. Processing service provider network 326 may sometimes be referred to herein as a cloud network, a cloud services network, a cloud service provider network, a cloud processing network, a cloud computing network, a cloud processing service provider network, a service network, a service provider network, a remote service provider network, a remote services network, a remote processing network, or a remote data processing network. If desired, one or more computing devices in communications network 320 may belong to multiple subnetworks within network 320. For example, a given computing device may belong to one or more of networks 322, cryptocurrency network 282, pool management equipment 278, pool 280, or any other desired subnetworks of network 320. Device 300 may participate in cryptocurrency network 282 and pool 280 (e.g., for performing cryptocurrency mining operations).

Remote service provider organizations 324 may charge a fee to use the digital services performed by the corresponding network 322. Such fees may help to cover the costs of maintaining and operating network nodes 326. If desired, such fees may generate profit for service provider organizations 324. Service provider networks 322 may require payment from the user of device 300 or from another party in order to perform remote digital services on data received from electronic device 300. In some scenarios, the operator of device 300 arranges payment in advance for services provided by cloud 322 such that the payment covers a certain number of processing instances performed by the cloud or a certain time period. However, such payment in advance may result in processing instances or time periods that the user paid for going unused (e.g., when the user does not require such processing operations to be performed as often as anticipated). In some scenarios, the user of device 300 performs a credit card transaction (e.g., using a payment application running on processing circuitry 302) to pay for the processing services. However, in practice, credit card company fees imposed on credit card transactions may become excessively costly to the user and can sometimes outweigh the cost of the payment itself.

If desired, storage and processing circuitry 302 may use cryptocurrency generated by embedded mining circuitry 116 for obtaining access to remote digital services performed by one or more networks 322 (e.g., cryptocurrency rewards provided to hardcoded user wallet 304). For example, processing circuitry 302 may access or call cryptocurrency (e.g., bitcoins) associated with user wallet 304 that was generated by embedded mining circuitry 116 during normal device operation. The accessed cryptocurrency may be used for performing transactions for remote digital services provided by service provider network 322. For example, processing circuitry 302 may access an application programming interface (API) associated with wallet 304 to allow the user of device 300 to use the cryptocurrency in wallet 304 (e.g., cryptocurrency mined by device 300) to purchase remote digital processing services from service provider organizations 324. In another suitable arrangement, circuitry 302 may access an API associated with wallet 304 autonomously to purchase digital processing services without receiving a user instruction to do so.

By using cryptocurrency in wallet 304 to perform transactions for remote digital services, device 300 may convert power (e.g., power consumed by mining circuitry 116) into processed data that could not have otherwise been generated by device 300 itself (e.g., due to the limited processing power of circuitry 302, etc.). By using cryptocurrency in wallet 304, device 300 may purchase remote digital services without requiring a user to pay for a batch of processing instances in advance. The use of the generated cryptocurrency rewards may allow the remote processing services to be purchased without incurring cumbersome credit card fees for the transactions. Because mining circuitry 116 is embedded within device 300 (e.g., during manufacture of device 300) and configured to mine cryptocurrency for user 290 autonomously, user 290 need not have any knowledge of the cryptocurrency protocol (which can often be complex) or how to operate mining circuitry 116 to receive a stream of the cryptocurrency while operating device 300.

For example, the user of devices 300 may only need to initialize or otherwise set up an account with pool manager 278 or cryptocurrency network 282 to begin receiving a stream of cryptocurrency (e.g., an application running on processor 302 may present the user with the option of creating an account upon first boot up of device 302, etc.). Upon signing up for an account with pool manager 278, software running on device 300, pool manager 278, or elsewhere may create a link between hardcoded user wallet 304 and the user that signed up for the account (e.g., so that cryptocurrency rewards generated by mining circuitry 116 on that user's devices 300 are directed to the user's account after signing up for the account). After the user has signed up, mining circuitry 116 may proceed to autonomously contribute hashing shares to pool 280 without further input from the user. Rewards generated by the contribution of hashing shares may be provided to user wallet 304 by pool manager 278. The rewards may then be accessed by the processor to pay for remote digital services that are performed on data transmitted from device 300. In this way, device 300 may both generate and consume cryptocurrency (e.g., bitcoins) in addition to performing other useful device functions for the user (e.g., device 300 may effectively pay for itself and its own access to premium digital services).

Figure 14:
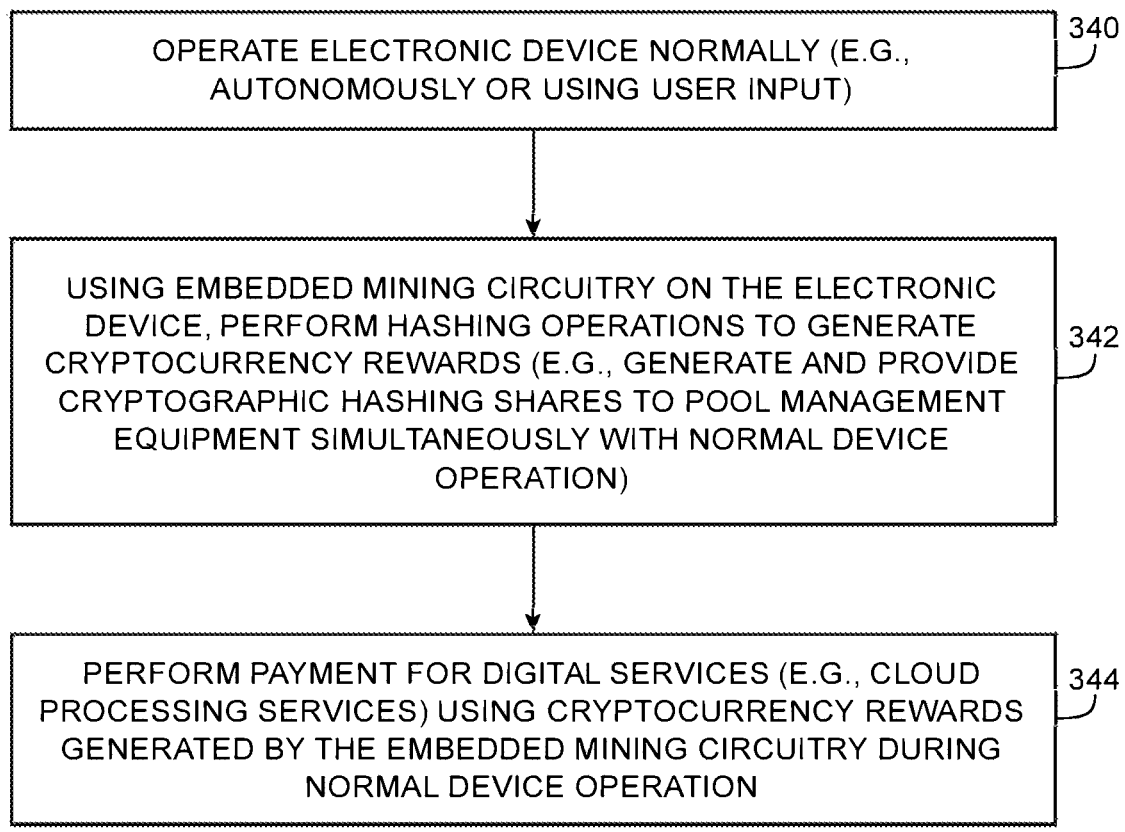
FIG. 14 is a flow chart of illustrative steps that may be performed by an electronic device for consuming cryptocurrency rewards generated by embedded mining circuitry in obtaining access to remote digital services in accordance with an embodiment of the present invention.

FIG. 14 is a flow chart of illustrative steps that may be performed by an electronic device having integrated mining circuitry. The steps of FIG. 14 may, for example, be performed by electronic device 300 of FIG. 13 to use generated cryptocurrency rewards in accessing remote digital services such as remote processing services. Electronic device 300 may include embedded mining circuitry 116 for mining a cryptocurrency while also supporting other applications that are unrelated to mining cryptocurrency.

At step 340, electronic device 300 may operate normally. For example, a user may use device 300 to browse the internet using an internet application on processor 302, use a streaming video service application on processor 302 to stream video content, use an online shopping application on processor 302, play a gaming application on processor 302, capture photos using camera 311, etc. If desired, electronic device 300 may operate normally without a user input. For example, device 300 may monitor its surrounding environment using sensors 310, may perform autonomous image processing operations, may autonomously perform networking operations such as network routing or switching, etc.

At step 342, integrated mining circuitry 116 may complete a function according to a cryptocurrency protocol to generate cryptocurrency rewards. For example, embedded circuitry 116 may perform hashing operations to solve a cryptographic puzzle for generating cryptocurrency according to the corresponding cryptocurrency protocol. If desired, mining circuitry 116 may communicate directly to cryptocurrency network 282. In another suitable arrangement, mining circuitry 116 may participate in a mining pool 280 and may communicate with pool manager 278 (FIG. 12) for performing the cryptographic hashing operations. Mining circuitry 116 may generate cryptocurrency rewards concurrently with normal device operation (e.g., step 342 may be performed concurrently with step 340) or while device 300 is in a cryptocurrency mining mode or an idle mode, for example.

At step 344, processing circuitry 302 may determine that remote digital services are to be performed. Processing circuitry 302 may identify the remote digital services to be performed and may identify data on which remote digital services are to be performed. Processing circuitry 302 may transmit the identified data to a selected remote processing network 322 for processing. Processing circuitry 302 may perform a payment transaction for the remote digital services using the generated cryptocurrency (e.g., using the cryptocurrency rewards generated while processing step 342). For example, processing circuitry 302 may perform payment concurrently with providing the transmitted data to remote processing network 322, prior to transmitting the data to remote processing network 322, or after transmitting the data to remote processing circuitry 322. If desired, step 344 may be performed concurrently with step 342 (e.g., mining circuitry 116 may continue to mine cryptocurrency while processor 302 arranges remote processing services for the identified data).

Figure 15:
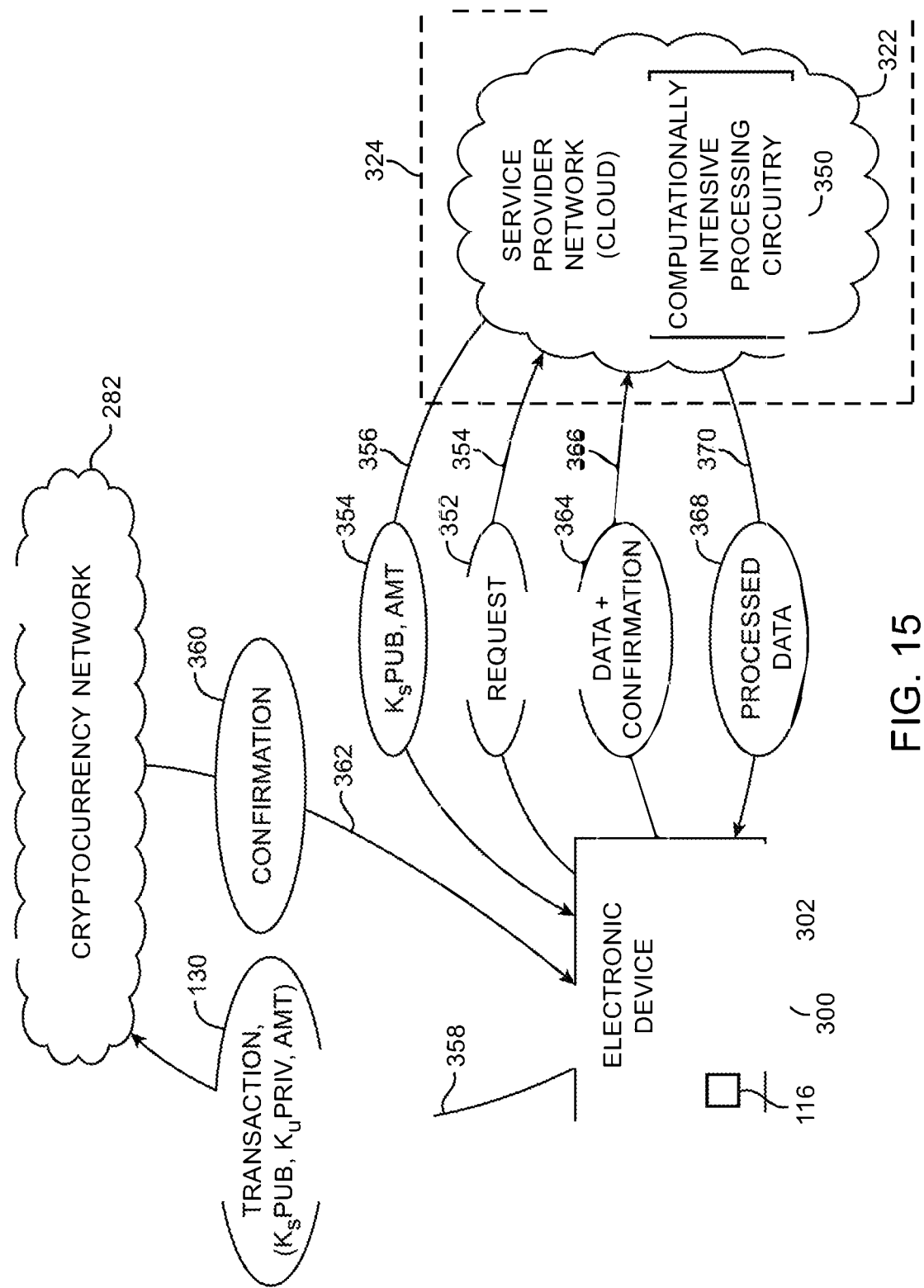
FIG. 15 is a flow diagram showing how an illustrative electronic device may transmit transactions to a cryptocurrency network using payment information associated with a remote digital service provider to obtain access to processing services provided by the remote digital service provider in accordance with an embodiment of the present invention.

FIG. 15 is an illustrative flow diagram showing how processing circuitry 302 may obtain access to a remote processing service using cryptocurrency generated by embedded mining circuitry 116. As shown in FIG. 15, processing circuitry 302 may identify a given remote processing service provider network 322 for performing computationally intensive processing operations on identified data.

Processing circuitry 302 may identify remote processing operations to perform on the identified data (e.g., processing services performed by identified service network 322). Electronic device 300 may transmit processing request 352 to service provider network 322 as shown by path 354. Processing request 352 may identify the remote processing operations to perform on the identified data. If desired, request 352 may include the data to be processed itself.

Service provider network 322 may include computationally intensive processing circuitry 350 for performing the identified remote processing operations on the identified data. Computationally intensive processing circuitry 350 may have greater processing power than processing circuitry 302 on device 300. Processing circuitry 350 may be distributed over one or more device nodes 326 in network 322. Service provider network 322 may be maintained by a corresponding remote processing service provider organization 324. Service provider organization 324 may maintain digital wallet information associated with (e.g., owned by) the service provider organization. For example, one or more computing nodes 326 or other computing systems operated by organization 324 may store public and/or private keys of a cryptographic public-private key pair associated with the digital wallet owned by organization 324.

Remote service provider network 322 may provide payment information 354 to processing circuitry 302 on device 300 as shown by path 356. Payment information 354 may include the public key $K_S PUB$ associated with service provider organization 324 and a corresponding amount AMT. Amount AMT may be the cost of performing the remote processing operations at service provider network 322 for device 300. Amount AMT may be identified by an amount of cryptocurrency (e.g., an amount of bitcoins). In another suitable arrangement, payment information 354 may be provided to the user's electronic device by another device such as a server associated with organization 324 but that does not participate in network 322 or by another server that is not associated with organization 324.

Processing circuitry 302 may generate a transaction 130 (FIG. 4) based on received payment information 354. Transaction 130 has a destination field that includes public key $K_S PUB$ of service provider organization 324 and an amount field that includes amount AMT. Processing circuitry 302 may identify wallet 304 of the user in the source field of transaction 130 and may sign transaction 130 using the private key $K_U PRIV$ of the user of device 300 (e.g., to ensure the authenticity of the transaction). Device 300 may transmit transaction 130 to cryptocurrency network 282 (e.g., via pool manager 278 or directly) as shown by path 358. The nodes of network 282 may decrypt transaction 130 using the public key $K_U PUB$ of the user of device 300 if desired.

In another suitable arrangement, device 300 may store payment information 354 and may call the stored payment information for generating transaction 130. For example, device 300 may pre-store the public key and/or the amount in information 354 (e.g., the public key may be hard-coded into mining circuitry 116 and/or circuitry 302 or may be otherwise stored on circuitry 302). If desired, device 300 may store information 354 after receiving the information from network 322 for generating a first transaction 130 and may call the stored information to generate subsequent transactions 130 for purchasing subsequent remote processing services from that network 322. In this way, processing circuitry 302 may generate transaction 130 for purchasing the remote processing operations without sending a request 352 to network 322 each time the remote processing operations are to be performed. In yet another suitable arrangement, device 300 may generate coinbase transactions identifying the wallet of network 322 so that new cryptocurrency rewards generated by mining circuitry 116 are automatically partitioned to the wallet of network 322.

Cryptocurrency network 282 may verify transaction 130 and may record the transaction in the global ledger. In this way, cryptocurrency stored in user wallet 304 (e.g., associated with the user's public key) may be transferred to the wallet owned by service provider network 324 in a manner that is acknowledged by each node of network 282. Cryptocurrency network 282 may transmit transaction confirmation information 360 to device 300 as shown by path 362. Confirmation information 360 may identify that cryptocurrency in the amount AMT has been transferred from user wallet 304 to the wallet owned by remote processing organization 324, and that the transaction has been successfully verified and recorded by the cryptocurrency network. If desired, network 282 may transmit confirmation information 360 directly to remote processing network 322 in addition to providing the information to device 300 or instead of providing the information to device 300.

Electronic device 300 may forward the received confirmation information and the data to be processed 364 to remote processing network 322 as shown by path 366. In scenarios where the data is sent along with request 352, device 300 may pass only the confirmation to network 322. Network 322 may verify that successful payment has taken place upon receiving the transaction confirmation and may subsequently perform the remote processing operations on the data received from device 300. If desired, network 322 may generate processed data 368 (e.g., a processed version of the data received from device 300 or other data) and may transmit the processed data to device 300 as shown by path 370. In another suitable arrangement, processed data 368 is not transmitted back to device 300 (e.g., in scenarios where the processing service provided by network 322 involves storing the data in a cloud-maintained database, etc.). In this way, device 300 may utilize cryptocurrency generated by embedded mining circuitry 116 to purchase remote data processing services that are otherwise unavailable to the device itself. The example of FIG. 15 in which remote processing services are performed by network 322 is merely illustrative. In general, any desired remote digital services may be performed by network 322 in response to receiving confirmation 360.

Figure 16:
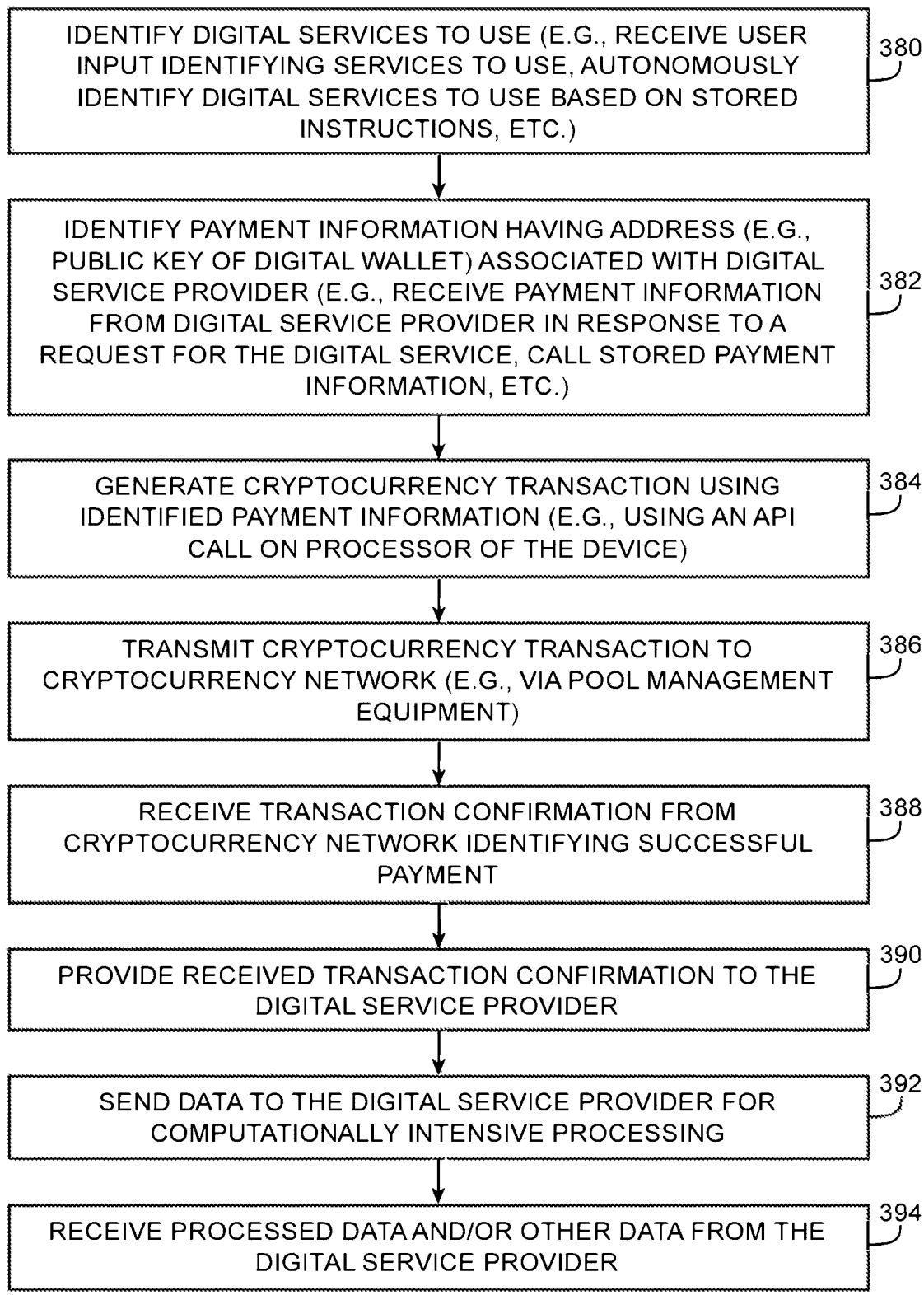
FIG. 16 is a flow chart of illustrative steps that may be performed by processing circuitry for using cryptocurrency rewards generated by embedded mining circuitry in obtaining access to remote digital services provided by a remote digital service provider in accordance with an embodiment of the present invention.

FIG. 16 is a flow chart of illustrative steps that may be performed by processor 302 on device 300 for obtaining access to remote digital services such as remote processing operations using cryptocurrency generated by embedded mining circuitry 116. The steps of FIG. 16 may, for example, be performed by device 300 while processing step 344 of FIG. 14.

At step 380, processor 302 may identify remote digital services to use. For example, processor 302 may receive a user input identifying the services to use (e.g., the user may instruct processor 302 to utilize the remote services or the user may perform some other operation in an application that necessitates the usage of the remote digital services). As another example, processor 302 may autonomously identify the digital services to use (e.g., a particular service provider network 322 and particular service(s) provided by that network) based on a stored set of instructions or a control signal received from another device. If desired, processor 302 may transmit request 352 to the identified service provider network 322. In another suitable arrangement, processor 302 need not transmit any request prior to generating transaction 130.

At step 382, processor 302 may identify payment information 354 associated with identified service provider network 322. For example, processor 302 may receive a public key $K_S$PUB associated with network 322 and a corresponding amount AMT in response to sending request 352 to network 322. In another suitable arrangement, processor 302 may call stored copies of public key $K_S$PUB associated with network 322 and/or amount AMT.

At step 384, processor 302 may generate transaction 130 using the identified payment information. For example, processor 302 may issue an API call that calls hardcoded user public and/or private key information 304 for generating transaction 130.

At step 386, device 300 may transmit transaction 130 to cryptocurrency network 282.

At step 388, device 300 may receive transaction confirmation 360 from network 282. Transaction confirmation 360 may verify that the payment identified by transaction 130 was successful and recorded by the cryptocurrency network.

At step 390, device 300 may forward transaction confirmation 360 to remote service provider network 322.

At step 392, device 300 may transmit the data upon which the identified digital services are to be performed to provider network 322. The example of FIG. 16 is merely illustrative. If desired, step 392 may be performed before step 390, concurrently (e.g., simultaneously) with step 390, prior to step 382, prior to step 384, concurrently with step 380, concurrently with step 386, prior to step 386, or at any other desired time.

At step 394, processing circuitry 300 may receive processed data 368 upon which network 322 performed the remote digital services. Processing circuitry 300 may store processed data 368, perform additional processing on data 368, transmit data 368 to other devices, or may perform any other desired operations on the processed data. If desired, step 394 may be omitted.

In one possible example, device 300 may be a digital camera device or other device having digital imaging capabilities. In this example, camera 311 captures image data from a scene and passes the image data to processing circuitry 302 for processing and storage. Processing circuitry 302 may perform image processing operations on the received image data. For example, circuitry 302 may perform gamma correction, white balancing, cropping, or other image processing operations on the received image data. However, in practice, processing circuitry 302 may have relatively limited processing capabilities. For example, some image processing operations such as face recognition operations may be too computationally taxing to perform using circuitry 302 or to perform using circuitry 302 in a reasonable amount of time.

If desired, processing circuitry 302 may identify advanced image processing operations such as facial recognition operations to be performed on the captured image data. Processing circuitry 302 may identify the advanced image processing operations to be performed based on a user input (e.g., in which the user instructs circuitry 302 to perform facial recognition operations on the captured image data) or may autonomously identify the image processing operations (e.g., processing circuitry 302 may be configured to perform facial recognition operations on all captured images). Processing circuitry 302 may identify an image processing service provider network 322 that performs advanced image processing operations. Processing circuitry 302 may identify payment information associated with performing the identified advance image processing operations at the image processing service provider. For example, processing circuitry 302 may identify a public key of the organization that operates the image processing service provider network and the cost of performing facial recognition operations.

Processing circuitry 302 may generate a transaction 130 having the identified public key in a destination field and the identified cost in an amount field. Device 300 may transmit the transaction 130 to network 282 and may receive a corresponding confirmation 360 from the network. Device 300 may relay confirmation 360 to the image processing service provider network along with the image data for processing. The image processing service provider may identify that payment has been completed and may subsequently perform facial recognition operations on the captured image data. The image processing service provider may transmit processed data 368 including information about faces in the captured image data back to device 300. In this way, device 300 may effectively pay for its own image processing services, even though the processing services may be computationally intensive and may require cloud computing resources 322 to complete.

In another example, device 300 may be an environmental monitoring device such as a thermostat device. In this scenario, device 300 may gather temperature information using sensors 310 and may transmit the temperature information to a corresponding remote processing service 322. Remote processing service 322 may process the received temperature information, may store the received temperature information, and may provide the received temperature information to a user of device 300 or to any other desired entity in exchange for a fee. Cryptocurrency rewards generated by thermostat device 300 may be provided to the operator of remote processing service to effectively pay for these services. By offloading storage and processing resources from device 300 to cloud service 322, device 300 may be less expensive to manufacture and may therefore be manufactured in greater quantities for a given cost than devices that do not offload processing resources. By generating cryptocurrency rewards, device 300 may further reduce the cost of operating device 300 either for the user of device 300 or for other parties relative to devices that do not include embedded mining circuitry.

These examples are merely illustrative and, in general, device 300 may be any desired electronic device and service provider networks 322 may perform any desired remote digital services for device 300. In another suitable arrangement, services provided by networks 322 include access to a higher speed internet connection that would otherwise not be available to device 300. Device 300 may use cryptocurrency rewards generated by embedded mining circuitry 116 (e.g., using a relatively slow speed internet connection service) to obtain access to the higher speed internet connection service.

Figure 17:
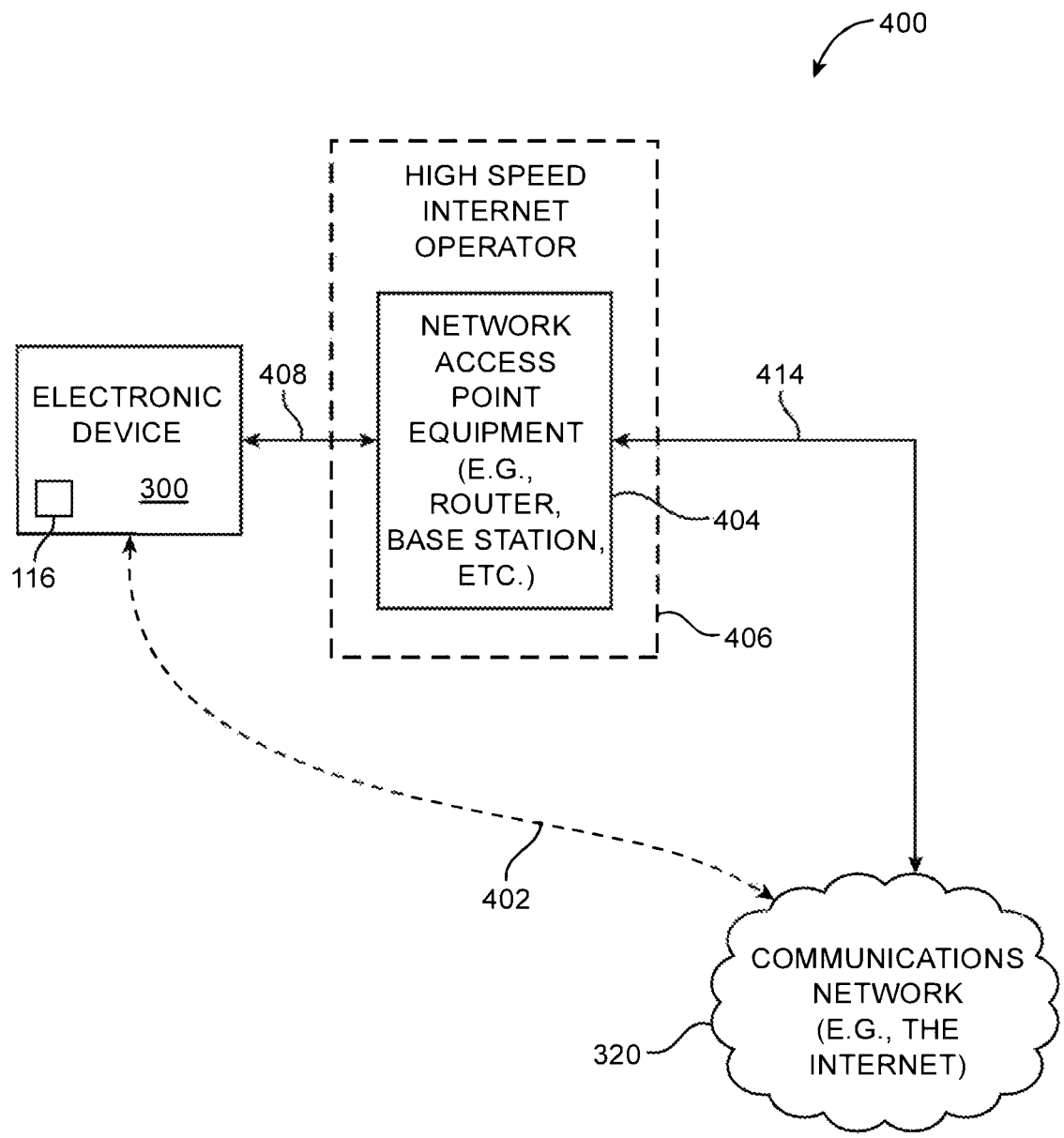
FIG. 17 is a diagram showing how an illustrative electronic device may use cryptocurrency rewards generated by embedded mining circuitry for obtaining access to a high speed network connection in accordance with an embodiment of the present invention.

FIG. 17 is an illustrative diagram showing how electronic device 300 may obtain access to a high speed internet connection using cryptocurrency rewards generated by embedded mining circuitry 116. As shown in FIG. 17, system 400 includes an electronic device 300 coupled to communications network 320 via relatively low speed connection 402 (e.g., a 3G connection, dial-up connection, DSL connection, or any other relatively slow speed connection). Connection 402 may include a corresponding low speed access point device such as a router or switch and corresponding low speed internet service provider equipment (not shown for the sake of clarity). Device 300 may generate cryptocurrency rewards over low speed internet connection 402 (e.g., by sending hashing shares over path 402 and receiving mining control signals over path 402).

During normal operation of device 300, device 300 may have the opportunity to connect to high speed access point equipment 404 (e.g., a high speed router, base station, or other equipment having a higher data rate than connection 402). For example, a user of device 300 may walk into the vicinity of equipment 404 or may go to a location at which the user can connect device 300 to equipment 404 using a wired connection (e.g., an internet café, library, school, or other location). Device 300 may communicate with high speed equipment 404 over link 408. Link 408 may be a wireless link (e.g., an Ethernet link) or a wired link (e.g., a Wi-Fi link or cellular data link). Equipment 404 may communicate with communications network 320 over high speed link 414. High speed link 414 may include a high speed wireless link (e.g., a 4G Long Term Evolution link or other high speed wireless links) and/or a high speed wired link. In general, slow speed internet connection 402 is less expensive to access than high speed internet connection associated with access point 404 (e.g., a user may pay a smaller fee per month to access connection 402 than would be required to access link 414). As examples, slow speed link 402 may support a data rate of less than 1 MBps, whereas high speed link 414 supports a data rate of greater than 1 MBps, greater than 10 MBps, etc. This is merely illustrative and, in general, link 414 may be any link that conveys data with a higher data rate than link 408.

Equipment 404 may be maintained, owned, and/or operated by high speed internet operator 406. Operator 406 may include an internet service provider organization and/or an operator of the access point. Equipment 404 may selectively provide temporary access to high speed link 414 to one or more electronic devices such as device 300 in exchange for a nominal fee. Organization 406 may maintain a corresponding digital wallet (e.g., public and/or private key information). Electronic device 300 may use cryptocurrency rewards generated using mining circuitry 116 (and relatively slow internet connection 402) to purchase access to high speed internet connection 414 from high speed internet operator 406. For example, device 300 may generate a transaction 130 having the public key of operator 406 in a destination field to provide cryptocurrency rewards as payment to obtain access to high speed link 414. Upon receipt of confirmation information 360, network access point equipment 404 may establish a high speed network connection between device 300 and network 320 over high speed link 414.

Such processes may, for example, allow those device users who are otherwise unable to afford high speed internet access 414 to pay for temporary access to a high speed internet connection (e.g., without requiring any other sources of funds than the cryptocurrency rewards generated by the device). As device 300 continuously mines cryptocurrency rewards even while the device is performing other operations, the user wallet may be continuously replenished with cryptocurrency rewards over time. In this way, the device can effectively pay for its own temporary high speed internet access, even though the user is only required to pay for the less expensive, low speed internet connection 402 using other funds.

The foregoing is merely illustrative of the principles of this invention and various modifications can be made by those skilled in the art without departing from the scope and spirit of the invention. The foregoing embodiments may be implemented individually or in any combination.

The following description of the preferred embodiments of the invention is not intended to limit the invention to these preferred embodiments, but rather to enable any person skilled in the art to make and use this invention.

We claim:

1. An electronic device for processing captured sensor data using a remote processing service provider network, the electronic device comprising:
   sensor circuitry;
   hashing circuitry;
   communications circuitry;
   processing circuitry; and
   non-transitory storage circuitry comprising instructions that, when executed by the processing circuitry, control the processing circuitry to perform the steps of:
   generating, via the hashing circuitry, a first stream of data packets;
   generating, via the hashing circuitry, a first public key associated with a user of the electronic device;
   transmitting, via the communications circuitry the generated first stream of data packets to a peer-to-peer network;
   capturing, via the sensor circuitry, sensor data;
   requesting access to remote processing services provided by the remote processing service provider network;
   processing, via the sensor circuitry, the captured sensor data; and
   transmitting, via the communications circuitry, the captured sensor data to the remote processing service provider network,
   wherein requesting access to the remote processing services comprises:
      identifying a second public key associated with the remote processing service provider network;
      generating, via the hashing circuitry, a second stream of data packets that comprises: a source field that includes the first public key, a destination field that includes the second public key, and a first amount; and
      transmitting, via the communications circuitry, the generated second stream of data packets to the peer-to-peer network.

2. The electronic device of claim 1, wherein generating the first stream of data packets comprises:
   generating header data using the hashing circuitry, and
   including the header data, the first public key, and a second amount in the first stream of data packets.

3. The electronic device of claim 2, wherein the communications circuitry transmits the first stream of data packets and the second stream of data packets to the peer-to-peer network via a first network link.

4. The electronic device of claim 3, wherein the communications circuitry transmits the captured sensor data to the remote processing service provider network via a second network link.

5. The electronic device of claim 4, wherein transmitting the captured sensor data to the remote processing service provider network via the second network link comprises: requesting access to the second network link.

6. The electronic device of claim 5, wherein requesting access to the second network link comprises:
   transmitting, via the first network link, a request for access to the second network link to network access point equipment;
   identifying a third public key associated with the access point equipment;
   generating a third stream of data packets that comprises: a source field that includes the first public key, a destination field that includes the third public key, and a third amount, and
   controlling the communications circuitry to transmit the generated third stream of data packets to the peer-to-peer network via the first network link.

7. The electronic device of claim 1, wherein the sensor circuitry comprises camera circuitry, and wherein the remote processing services comprises image processing operations.

8. The electronic device of claim 1, wherein the sensor circuitry comprises atmospheric sensor circuitry or temperature sensor circuitry.

9. The electronic device of claim 1, wherein the sensor circuitry comprises motion detection circuitry, proximity sensor circuitry, smoke detector circuitry, or carbon monoxide detector circuitry.

10. The electronic device of claim 1, wherein the sensor circuitry comprises a microphone.

11. A method for processing data using an electronic device and a remote processing service provider network, the method comprising: with the electronic device:
   generating, via a hashing circuitry, a first stream of data packets;
   generating, via the hashing circuitry, a first public key associated with a user of the electronic device;
   transmitting, via a communications circuitry the generated first stream of data packets to a peer-to-peer network;
   capturing, via a sensor circuitry, sensor data;
   requesting access to remote processing services provided by the remote processing service provider network;
   processing, via the sensor circuitry, the captured sensor data; and
   transmitting, via the communications circuitry, the captured sensor data to the remote processing service provider network,
   wherein requesting access to the remote processing services comprises:
      identifying a second public key associated with the remote processing service provider network;
      generating, via the hashing circuitry, a second stream of data packets that comprises: a source field that includes the first public key, a destination field that includes the second public key, and a first amount; and
      transmitting, via the communications circuitry, the generated second stream of data packets to the peer-to-peer network.

12. The method of claim 11, wherein generating the first stream of data packets comprises:
   generating header data using the hashing circuitry, and
   including the header data, the first public key, and a second amount in the first stream of data packets.

13. The method of claim 11, wherein the first stream of data packets and the second stream of data packets are transmitted to the peer-to-peer network via a first network link.

14. The method of claim 13, wherein the captured sensor data is transmitted to the remote processing service provider network via a second network link.

15. The method of claim 14, wherein transmitting the captured sensor data to the remote processing service provider network via the second network link comprises: requesting access to the second network link.

16. The method of claim 15, wherein requesting access to the second network link comprises:

transmitting, via the first network link, a request for access to the second network link to network access point equipment;
identifying a third public key associated with the access point equipment;
generating a third stream of data packets that comprises: a source field that includes the first public key, a destination field that includes the third public key, and a third amount, and
controlling the communications circuitry to transmit the generated third stream of data packets to the peer-to-peer network via the first network link.

17. The method of claim 11, wherein the sensor circuitry comprises camera circuitry, and wherein the remote processing services comprises image processing operations.

18. The method of claim 11, wherein the sensor circuitry comprises atmospheric sensor circuitry, temperature sensor circuitry, motion detection circuitry, proximity sensor circuitry, smoke detector circuitry, or carbon monoxide detector circuitry.

19. The method of claim 11, wherein the sensor circuitry comprises a microphone.

20. A non-transitory computer-readable media storing instructions that, when executed by one or more processors, cause operations comprising:
generating, via a hashing circuitry, a first stream of data packets;
generating, via the hashing circuitry, a first public key associated with a user of an electronic device;
transmitting, via a communications circuitry the generated first stream of data packets to a peer-to-peer network;
capturing, via a sensor circuitry, sensor data;
requesting access to remote processing services provided by a remote processing service provider network;
processing, via the sensor circuitry, the captured sensor data; and
transmitting, via the communications circuitry, the captured sensor data to the remote processing service provider network,
wherein requesting access to the remote processing services comprises:
identifying a second public key associated with the remote processing service provider network;
generating, via the hashing circuitry, a second stream of data packets that comprises: a source field that includes the first public key, a destination field that includes the second public key, and a first amount; and
transmitting, via the communications circuitry, the generated second stream of data packets to the peer-to-peer network.

* * * * *